US012618757B2

(12) United States Patent
Whitmore, IV et al.

(10) Patent No.: US 12,618,757 B2
(45) Date of Patent: May 5, 2026

(54) SHAVING RAZOR COMPONENT TEST APPARATUS

(71) Applicant: The Gillette Company LLC, Boston, MA (US)

(72) Inventors: Joseph Lorenzo Whitmore, IV, Johnston, RI (US); Sana Fatema Pirmohamed, London (GB); Eric Viveros Borges, Plymouth, MA (US); Jeffrey Torres Couto, Berkley, MA (US)

(73) Assignee: The Gillette Company LLC, Boston, MA (US)

( * ) Notice: Subject to any disclaimer, the term of this patent is extended or adjusted under 35 U.S.C. 154(b) by 383 days.

(21) Appl. No.: 18/135,527

(22) Filed: Apr. 17, 2023

(65) Prior Publication Data

US 2024/0344946 A1    Oct. 17, 2024

(51) Int. Cl.
| | |
|---|---|
| *G01N 3/04* | (2006.01) |
| *B26B 21/40* | (2006.01) |
| *G01M 5/00* | (2006.01) |
| *G01M 99/00* | (2011.01) |
| *G01N 3/22* | (2006.01) |

(52) U.S. Cl.
CPC .................. *G01N 3/04* (2013.01); *G01N 3/22* (2013.01); *G01N 2203/0021* (2013.01); *G01N 2203/0282* (2013.01)

(58) Field of Classification Search
CPC .... G01N 3/04; G01N 3/22; G01N 2203/0021; G01N 2203/0282; G01L 5/00; B26B 21/22; B26B 21/4093
See application file for complete search history.

(56) References Cited

U.S. PATENT DOCUMENTS

2018/0333878 A1    11/2018  Sonnenberg et al.

FOREIGN PATENT DOCUMENTS

| | | | | |
|---|---|---|---|---|
| CN | 105372125 B | * | 2/2018 | ............. B25B 11/00 |
| CN | 109459169 A | | 3/2019 | |
| EP | 3546156 A1 | | 10/2019 | |
| WO | 2015197068 A1 | | 12/2015 | |

OTHER PUBLICATIONS

EPO Search Report and Opinion for Application No. 24165924.2; dated Sep. 6, 2024, 08 pages.

* cited by examiner

*Primary Examiner* — Brandi N Hopkins
(74) *Attorney, Agent, or Firm* — John M. Lipchitz

(57) ABSTRACT

A shaving razor component testing apparatus with a body. A rotatable clamp mounted to the body. A fixed clamp mounted to the body and spaced apart from the rotatable clamp. An actuator rotatably coupled to the rotatable clamp.

18 Claims, 21 Drawing Sheets

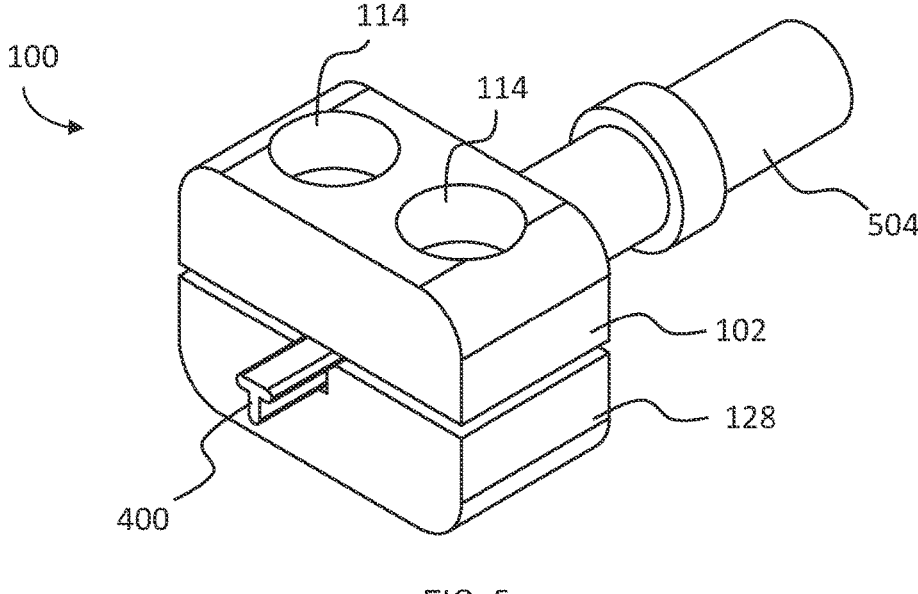
FIG. 5
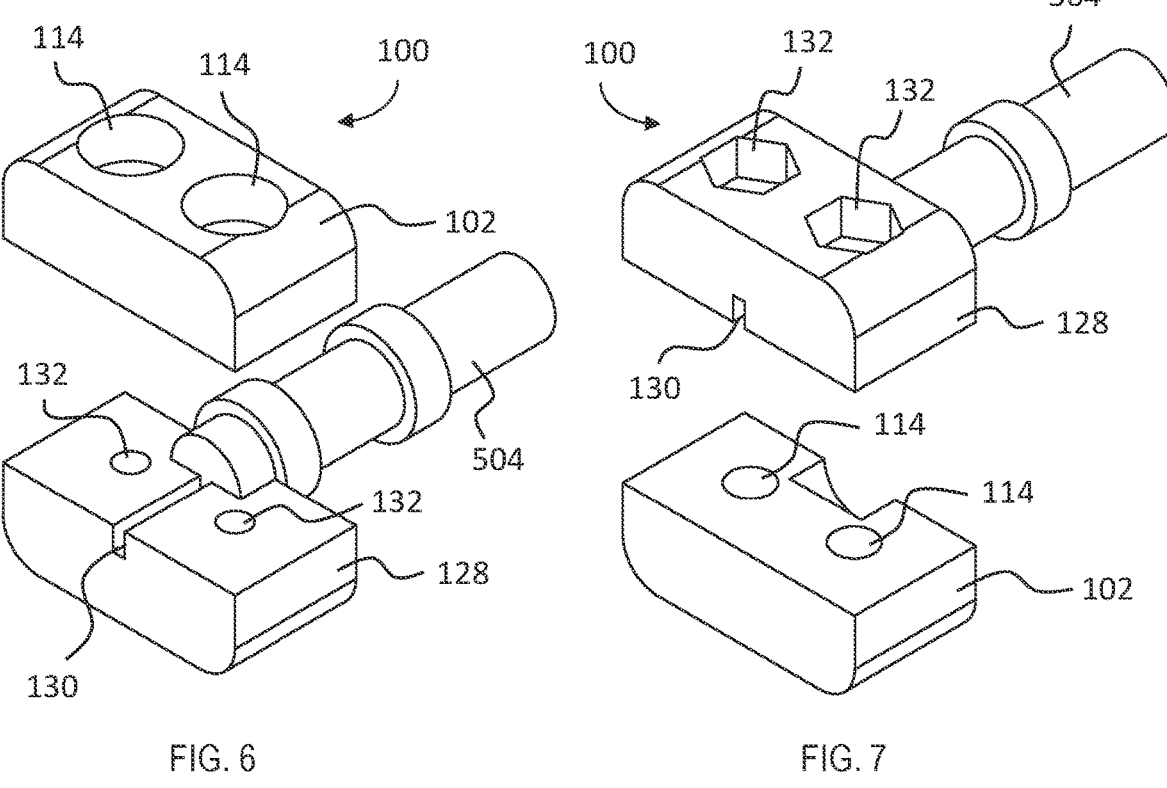
FIG. 6
FIG. 7

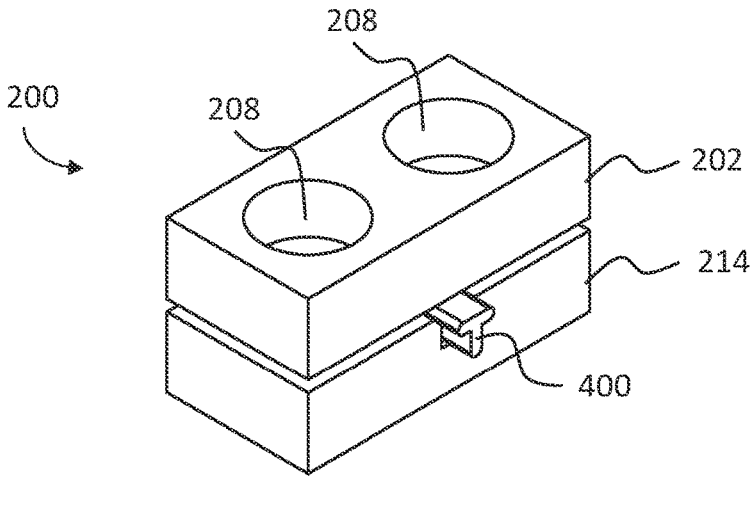
FIG. 8
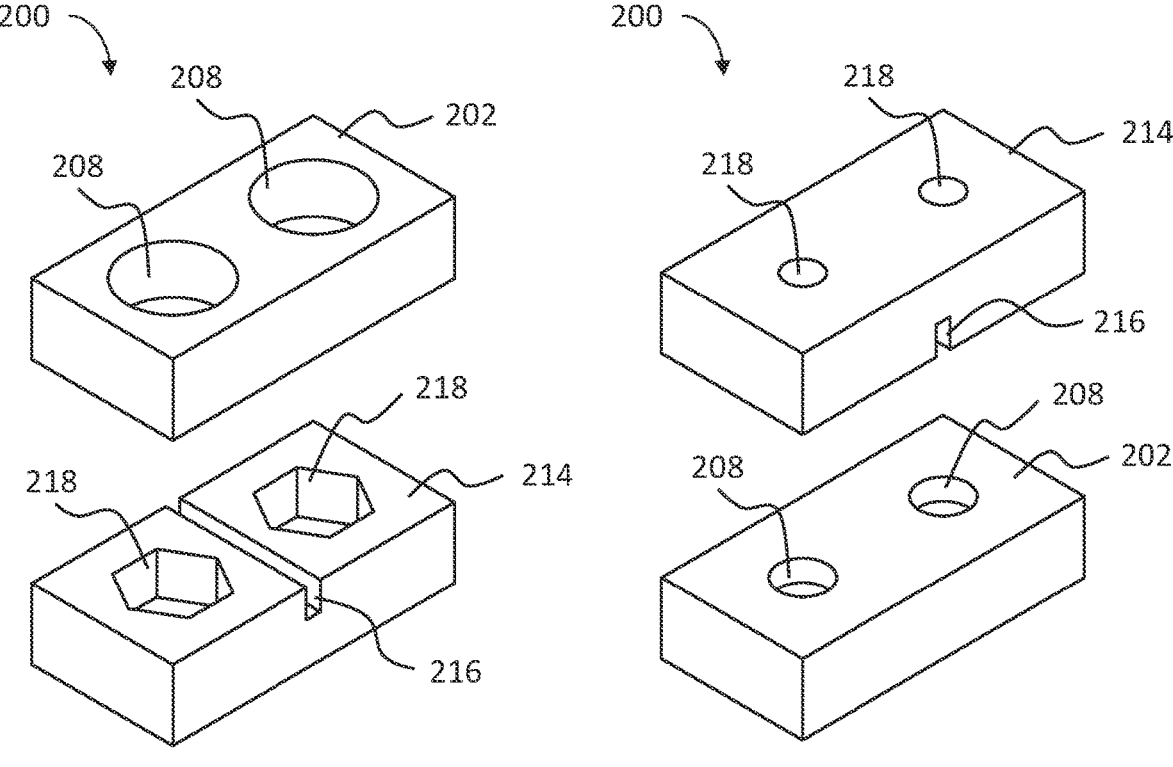
FIG. 9
FIG. 10

10
PROVIDING A ROTATABLE CLAMP

12
PROVIDING A FIXED CLAMP

14
SECURING A FIRST END OF A SHAVING RAZOR COMPONENT TO THE ROTATABLE CLAMP

16
SECURING A SECOND END OF THE SHAVING RAZOR COMPONENT TO THE FIXED CLAMP

18
ROTATING THE ROTATABLE CLAMP, WHEREIN SAID ROTATING CAUSES THE SHAVING RAZOR COMPONENT TO FAIL

20
MEASURING A DURATION OF THE ROTATING STEP

SHAVING RAZOR COMPONENT TEST APPARATUS

FIELD

The present disclosure relates generally to apparatuses for testing shaving razor components and more specifically to apparatuses for testing the flexibility, strength, and/or resiliency of shaving razor components.

BACKGROUND

Consumers of disposable and system shaving razors (i.e., razor handles having a replaceable razor cartridge) continue to demand improved product performance. As a result, razor manufacturers continually try to improve upon various shaving razor performance attributes that are desired by consumers. However, even when a better shaving razor is designed and manufactured, razor manufacturing companies, advertisers, and retailers face difficulty in communicating to the consumers, especially in a meaningful, clear, and visual manner, that a particular shaving razor component demonstrates improved or more effective performance, comfort, or other benefits compared to other shaving razor products.

Accordingly, there is a need for an apparatus and/or a method for demonstrating to consumers particular advantages of using certain shaving razors. There is also a need for a method to demonstrate the flexibility, strength, and/or resiliency of shaving razor components and to communicate these differences to consumers clearly.

The discussion of shortcomings and needs existing in the field prior to the present disclosure is in no way an admission that such shortcomings and needs were recognized by those skilled in the art prior to the present disclosure.

SUMMARY

Various embodiments solve the above-mentioned problems and provide devices useful for demonstrating the flexibility, strength, and/or resiliency of shaving razor components and for communicating these differences to consumers clearly.

Various embodiments relate to a shaving razor component testing apparatus comprising a body, a rotatable clamp mounted to the body, a fixed clamp mounted to the body and spaced apart from the rotatable clamp, and an actuator rotatably coupled to the rotatable clamp.

Various embodiments relate to a shaving razor component testing apparatus comprising: a body, a first rotatable clamp mounted to the body, a first fixed clamp mounted to the body and spaced apart from the first rotatable clamp, a second rotatable clamp mounted to the body, a second fixed clamp mounted to the body and spaced apart from the second rotatable clamp, and an actuator rotatably coupled to the first rotatable clamp and the second rotatable clamp.

These and other features, aspects, and advantages of various embodiments will become better understood with reference to the following description, figures, and claims.

BRIEF DESCRIPTION OF THE DRAWINGS

Many aspects of this disclosure can be better understood with reference to the following figures.

FIG. 5 is a schematic diagram providing an isometric view of a rotatable clamp clamping a razor component.

FIG. 6 is a schematic diagram providing an exploded isometric view of a rotatable clamp.

FIG. 7 is a schematic diagram providing an exploded isometric bottom view of a rotatable clamp.

FIG. 8 is a schematic diagram providing an isometric view of a fixed clamp clamping a razor component.

FIG. 9 is a schematic diagram providing an exploded isometric view of a fixed clamp.

FIG. 10 is a schematic diagram providing an exploded isometric bottom view of a fixed clamp.

FIG. 31 is a schematic diagram providing an isometric view of an actuator of a razor component testing apparatus.

FIG. 32 is a schematic diagram providing an isometric view of a drive belt of an actuator of a razor component testing apparatus.

Figure 1:
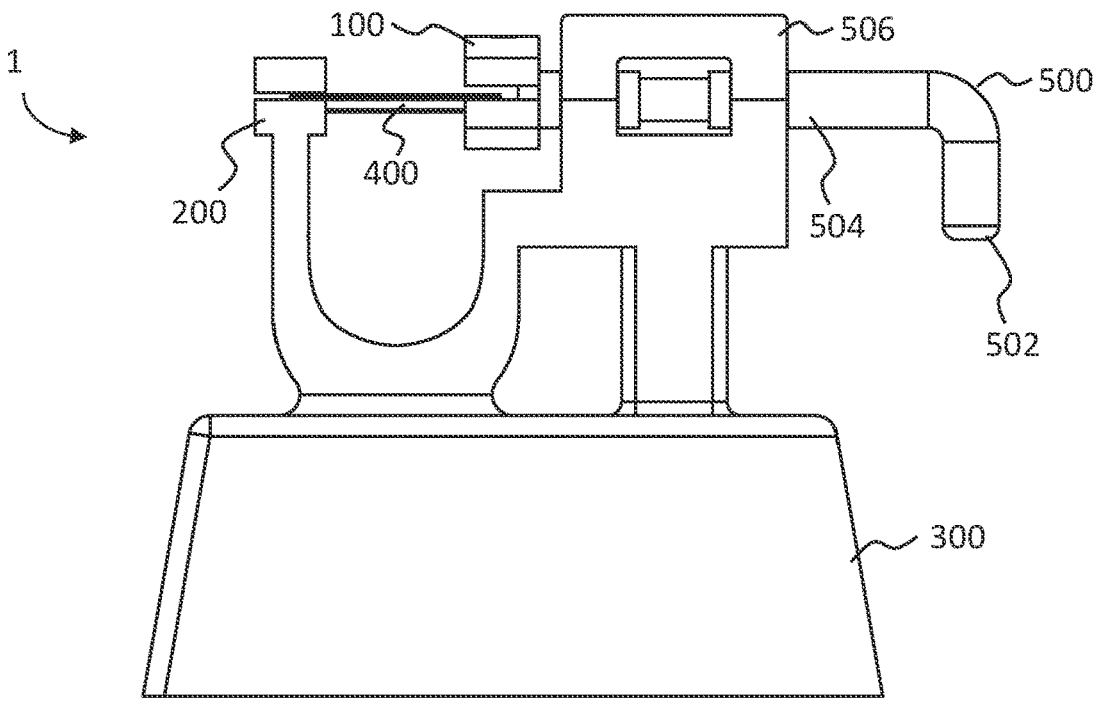
FIG. 1 is a schematic diagram providing a front view of a razor component testing apparatus.

It should be understood that the various embodiments are not limited to the examples illustrated in the figures.

DETAILED DESCRIPTION

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about," whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

In everyday usage, indefinite articles (like "a" or "an") precede countable nouns and noncountable nouns almost never take indefinite articles. It must be noted, therefore, that, as used in this specification and in the claims that follow, the singular forms "a." "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Figure 2:
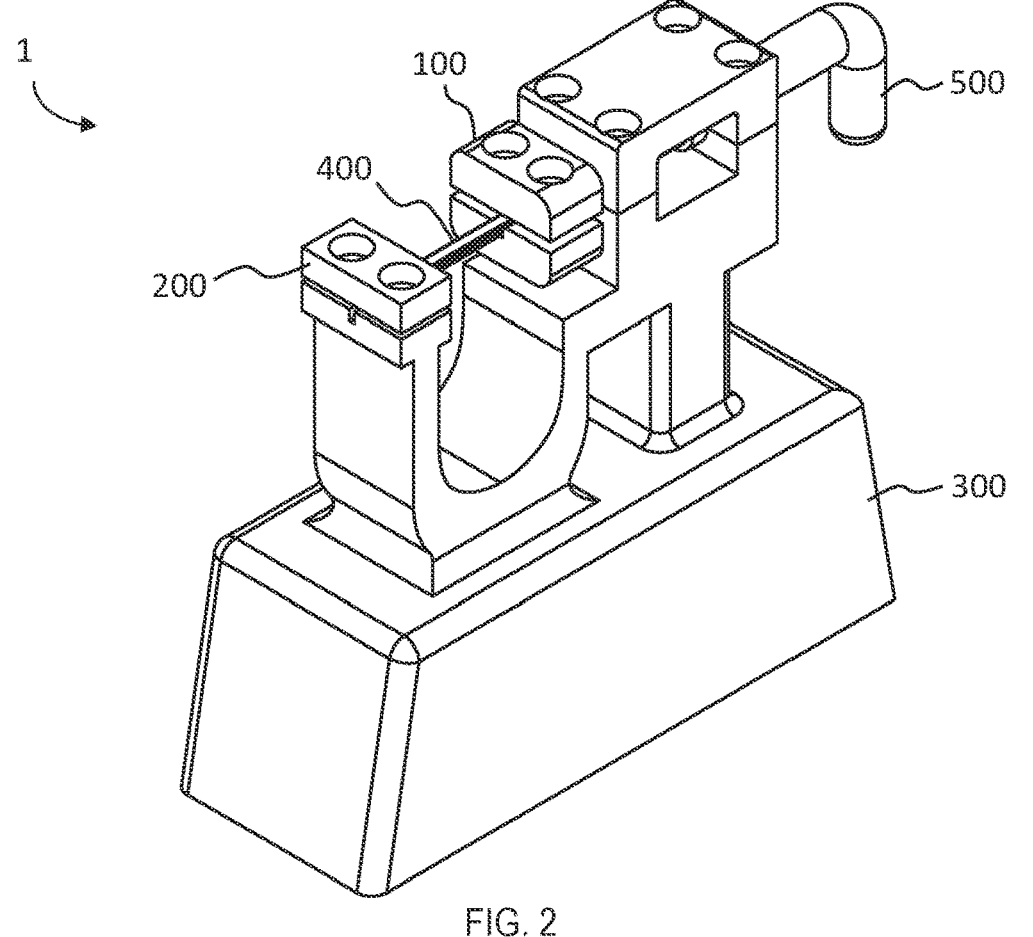
FIG. 2 is a schematic diagram providing an isometric view of a razor component testing apparatus.
Figures 3, 4:
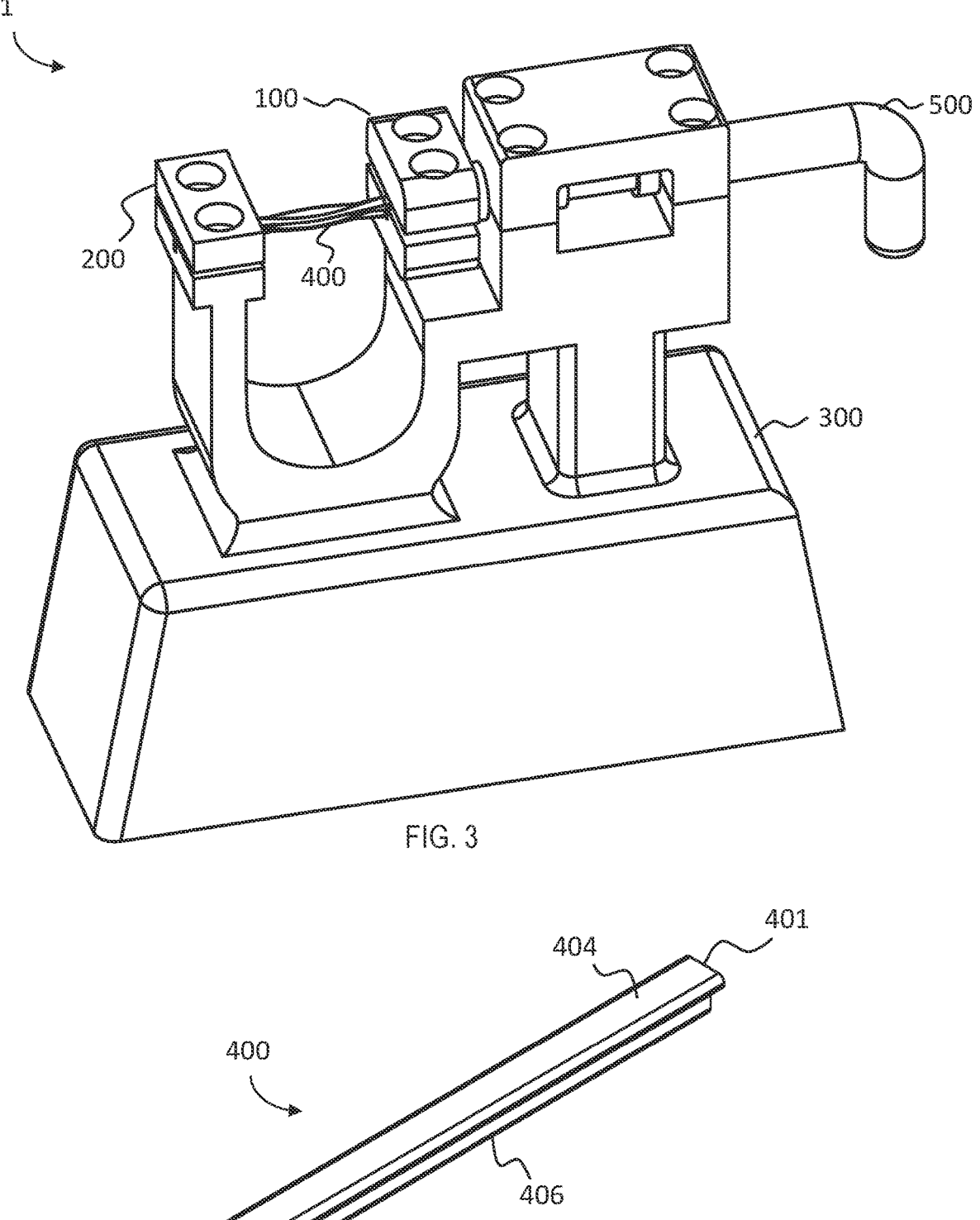
FIG. 3 is a schematic diagram providing an isometric view of a razor component testing apparatus during a rotation of a rotatable clamp.
FIG. 4 is a schematic diagram providing an isometric view of a razor component.

FIG. 1, FIG. 2, and FIG. 3 cooperate to illustrate a shaving razor component testing apparatus 1 and a function thereof. The razor component testing apparatus 1 may comprise a rotatable clamp 100, and a fixed clamp 200, which are both mounted to a body 300. The rotatable clamp 100 may be rotatably coupled to an actuator 500. The actuator 500 may comprise a crank handle 502 and a shaft 504 that may rotate within a frame 506. The frame 506 may be mounted to or integrally formed with the body 300. FIG. 3 shows the razor component testing apparatus 1 during a rotation of the rotatable clamp 100. When the actuator 500 is rotated, the rotatable clamp 100 may rotate and the fixed clamp 200 may remain stationary. The rotation may twist a shaving razor component 400 clamped between the rotatable clamp 100 and the fixed clamp 200. The twisting may eventually cause the shaving razor component 400 to fail. This test may facilitate a comparison of the flexibility, strength, and/or resiliency of shaving razor components, including, for example, components comprising different materials, such as ethyl vinyl acetate or high impact polystyrene.

FIG. 4 is a schematic diagram providing an isometric view of a razor component 400. The razor component 400 may have a first end 401 and a second end 402. The first end 401 may be clamped in the rotatable clamp 100. The second end 402 may be clamped in the fixed clamp 200. The razor component 400 may be any type of component, including for example a component made of ethyl vinyl acetate or high impact polystyrene. The razor component 400 may have any shape, for example, an extended T-shape as illustrated, comprising a horizontally extending top portion 404 and a vertically extending bottom portion 406 that is perpendicular to the horizontally extending top portion 404.

FIG. 5, FIG. 6, and FIG. 7 cooperate to illustrate various views of a rotatable clamp 100 of a razor component testing apparatus 1. FIG. 5 is a schematic diagram providing an isometric view of a rotatable clamp 100 clamping a razor component 400. The rotatable clamp 100 may comprise a top portion 102 and a bottom portion 128. The top portion 102 may comprise one or more apertures 114, which may accommodate a magnet, a bolt, or a nut to secure the top portion 102 to the bottom portion 128. The rotatable clamp 100 may be rotatably coupled to a drive shaft 504 of an actuator 500. FIG. 6 is a schematic diagram providing an exploded isometric view of a rotatable clamp 100. The bottom portion 128 may comprise one or more apertures 132, which may accommodate a magnet, a bolt, or a nut to secure the bottom portion 128 to the top portion 102. The bottom portion 128 may further comprise a bottom clamp groove 130 that may be shaped to receive a shaving razor component 400 or a portion thereof, such as, for example a vertically extending bottom portion 406 of a razor component 400 having an extended T-shape (See: FIG. 4). As will be discussed hereinafter, although not shown here, the top portion 102 may comprise a top clamp groove which may also be shaped to receive a shaving razor component 400. Such a top clamp groove make cooperate with the bottom clamp groove 130 to receive the shaving razor component 400. FIG. 7 is a schematic exploded isometric bottom view of a rotatable clamp 100, showing that the aperture 132 in the bottom portion 128 may receive a nut (not shown) to engage with a bolt (not shown) or a magnet (not shown) passing through the apertures 114 of the top portion 102.

Figure 14:
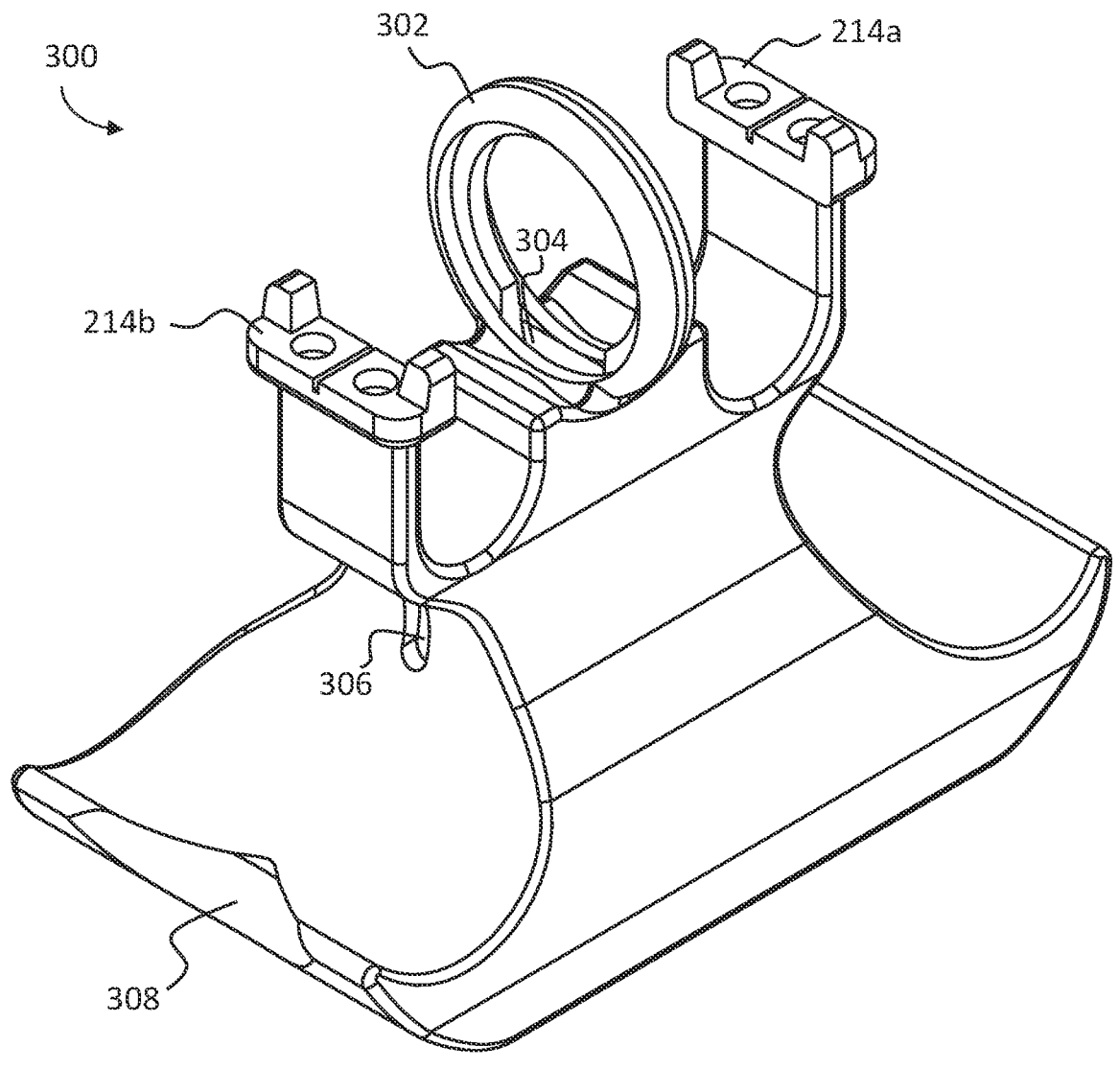
FIG. 14 is a schematic diagram providing an isometric view of a body of a razor component testing apparatus.

FIG. 8, FIG. 9, and FIG. 10 cooperate to illustrate various views of a fixed clamp 200 of a razor component testing apparatus 1. FIG. 8 is a schematic diagram providing an isometric view of a fixed clamp 200 clamping a razor component 400. The fixed clamp 200 may comprise a top portion 202 and a bottom portion 214. The top portion 202 may comprise one or more apertures 208, which may accommodate a magnet, a bolt, or a nut to secure the top portion 202 to the bottom portion 214. The fixed clamp 200 or the bottom portion 214 thereof may be rigidly affixed to or integrally formed with a body 300 of a razor component testing apparatus 2 (See: FIG. 14). FIG. 9 is a schematic diagram providing an exploded isometric view of a fixed clamp 200 and FIG. 10 is a schematic diagram providing an exploded isometric bottom view of a fixed clamp 200. The bottom portion 214 may comprise one or more apertures 218, which may accommodate a magnet, a bolt, or a nut to secure the bottom portion 214 to the top portion 202. The bottom portion 214 may further comprise a bottom clamp groove 216 that may be shaped to receive a shaving razor component 400. As will be discussed hereinafter, although not shown here, the top portion 202 may comprise a top clamp groove which may also be shaped to receive a shaving razor component 400. Such a top clamp groove may cooperate with the bottom clamp groove 216 to receive the shaving razor component 400.

It is to be appreciated that any of the apertures 114, 132, 208, 218 in the fixed clamp 200 or the rotatable clamp 100 may be configured to receive a magnet, to receive a nut (not shown), to receive a bolt (not shown) or to receive any other suitable device for generating a clamping force between the top portions 102, 202 and the corresponding bottom portions 128, 214. The clamping force may be in a range of about 1 N to about 30 N. The force may be calibrated for specific razor components 400 to avoid crushing the razor component 400 and to allow the razor component 400 to fail between the rotatable clamp 100 and the fixed clamp 200 instead of at the point where the razor component 400 is gripped by the rotatable clamp 100 or by the fixed clamp 200.

Figure 11:
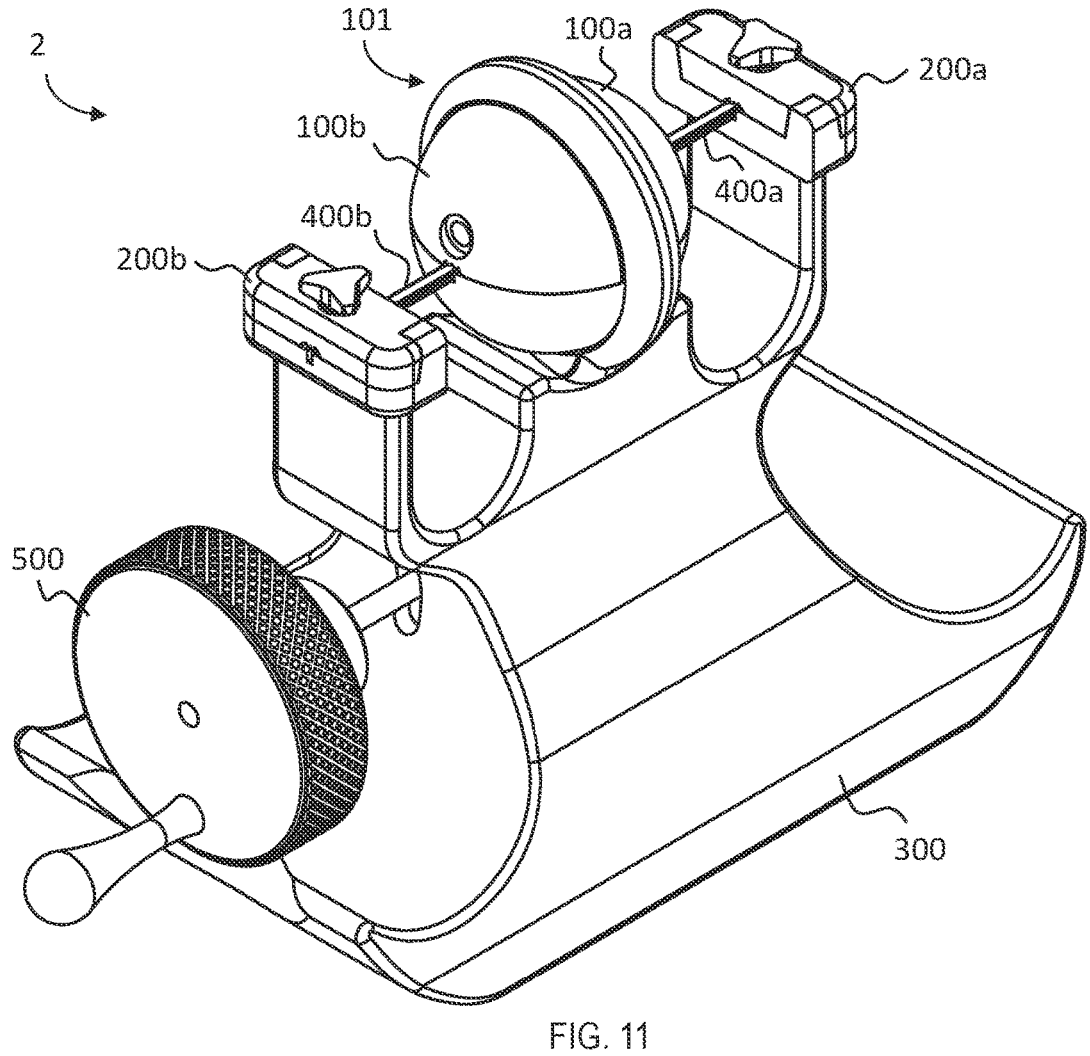
FIG. 11 is a schematic diagram providing an isometric view of a razor component testing apparatus.
Figure 12:
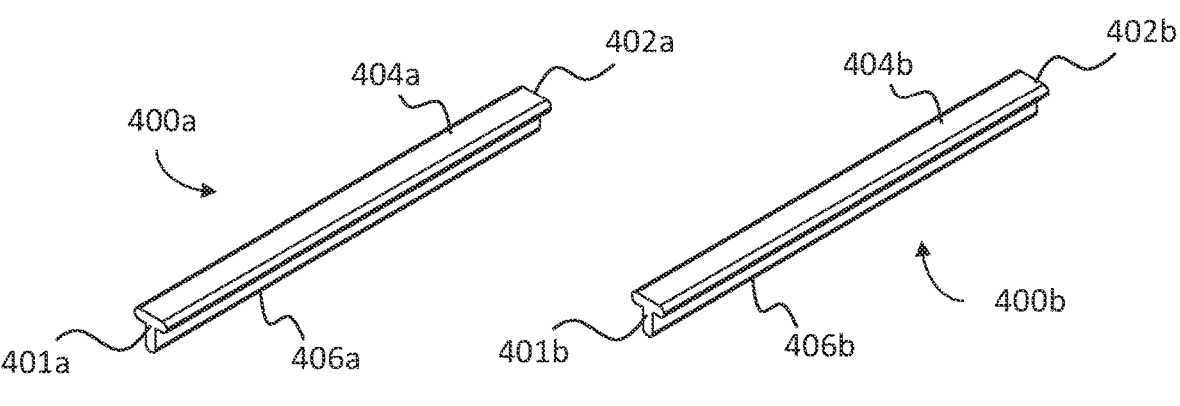
FIG. 12 is a schematic diagram providing an isometric view of a pair of razor components.
Figure 13:
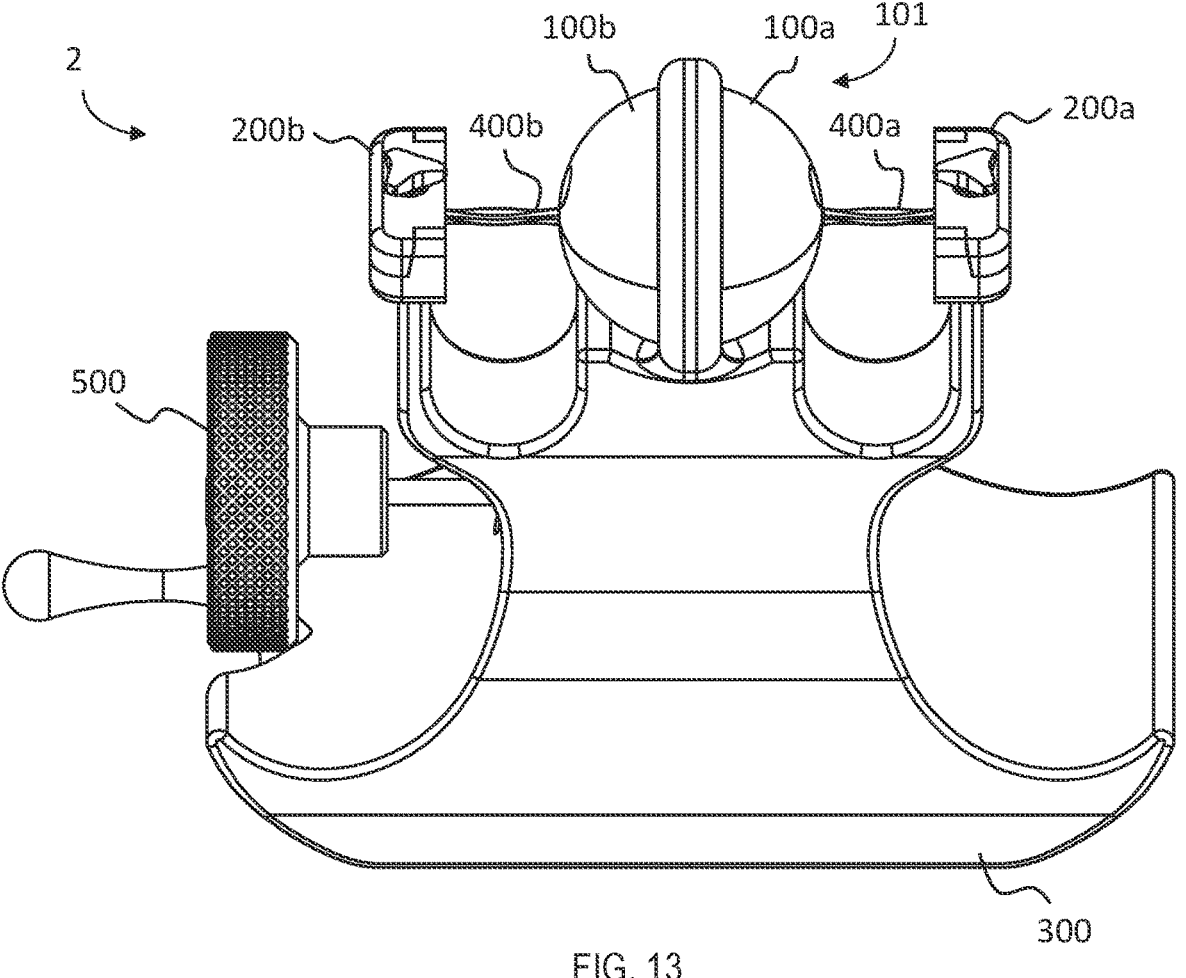
FIG. 13 is a schematic diagram providing an isometric view of a razor component testing apparatus during a rotation of a rotatable clamp assembly.

FIG. 11, FIG. 12, and FIG. 13 cooperate to illustrate a shaving razor component testing apparatus 2 and a function thereof. FIG. 11 is an isometric view of a razor component testing apparatus 2. The razor component testing apparatus 2 may comprise a rotatable clamp assembly 101. The rotatable clamp assembly 101 may comprise a first rotatable clamp 100a and a second rotatable clamp 100b. The razor component testing apparatus 2 may further comprise a first fixed clamp 200a and a second fixed clamp 200b. The rotatable clamp assembly 101 as well as the first fixed clamp 200a and the second fixed clamp 200b may be mounted to a body 300. As previously stated, the razor components 400a. 400b may have any shape, for example, an extended T-shape as illustrated, comprising a horizontally extending top portion 404a, b and a vertically extending bottom portion 406a, b that is perpendicular to the horizontally extending top portion 404.

FIG. 12 is a schematic diagram providing an isometric view of a pair of razor components 400a. 400b. The first shaving razor component 400a may comprise a first end 402a and a second end 402b. Similarly, the second shaving razor component 400b may comprise a first end 401b and a second end 402b. The first shaving razor component 400a may be clamped between the first rotatable clamp 100a and the first fixed clamp 200a. For example, the first end 401a of the first shaving razor component 400a may be clamped in the first rotatable clamp 100a while the second end 402a of the first shaving razor component 400a may be clamped in the first fixed clamp 200a. In like manner, the second shaving razor component 400b may be clamped between the second rotatable clamp 100b and the second fixed clamp 200b. For example, the first end 401b of the second shaving razor component 400b may be clamped in the second rotatable clamp 100b while the second end 402b of the second shaving razor component 400b may be clamped in the second fixed clamp 200b.

FIG. 13 is a schematic diagram providing an isometric view of a razor component testing apparatus 2 during a rotation of a rotatable clamp assembly 101 thereof. As shown in both FIG. 11 and FIG. 13, the razor component testing apparatus 2 may further comprise an actuator 500, which, as will be described hereinafter, may transfer rotational power to the rotatable clamp assembly 101 to rotate both the first rotatable clamp 100a and the second rotatable clamp 100b simultaneously. When the rotatable clamp assembly 101 is rotated, the first shaving razor component 400a and the second shaving razor component 400b may be twisted as shown in FIG. 13. The twisting may eventually cause one of the shaving razor components 400a, 400b to fail. This test may facilitate a comparison of the flexibility, strength, and/or resiliency of shaving razor components, including, for example, components comprising different materials, such as ethyl vinyl acetate or high impact polystyrene.

Figure 15:
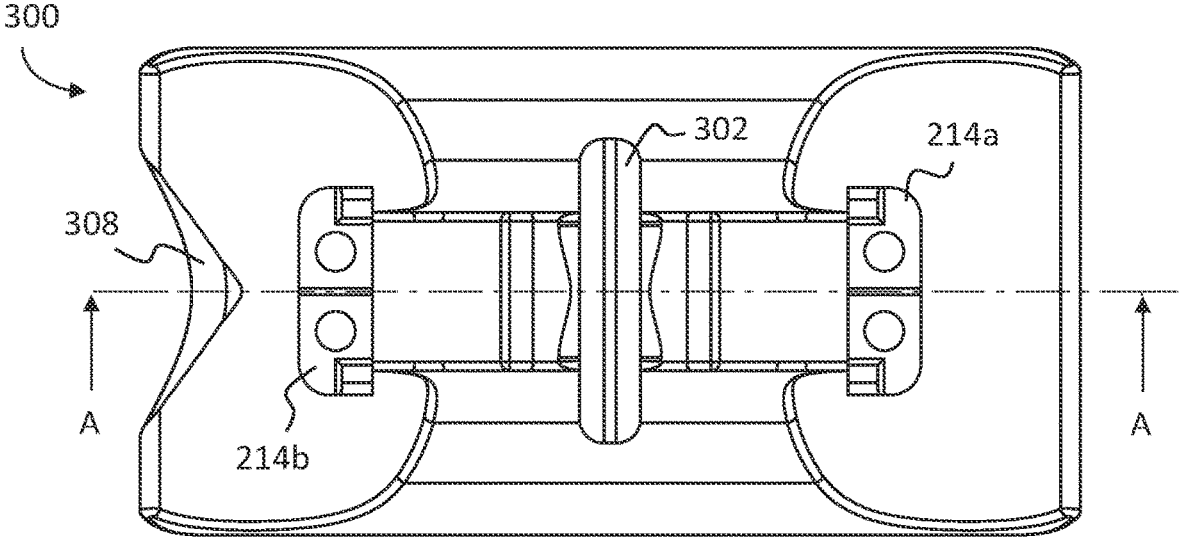
FIG. 15 is a schematic diagram providing a top view of a body of a razor component testing apparatus.
Figure 16:
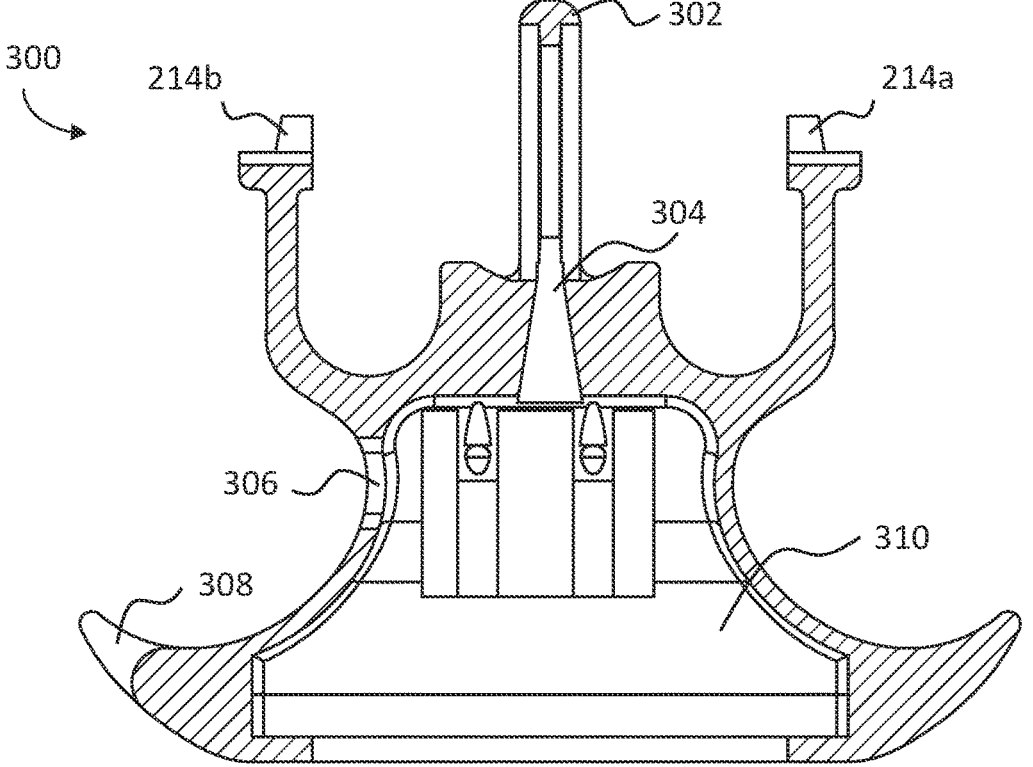
FIG. 16 is a schematic diagram providing a cross-sectional view of the body of the razor component testing apparatus shown in FIG. 15, along line A-A.
Figure 22:
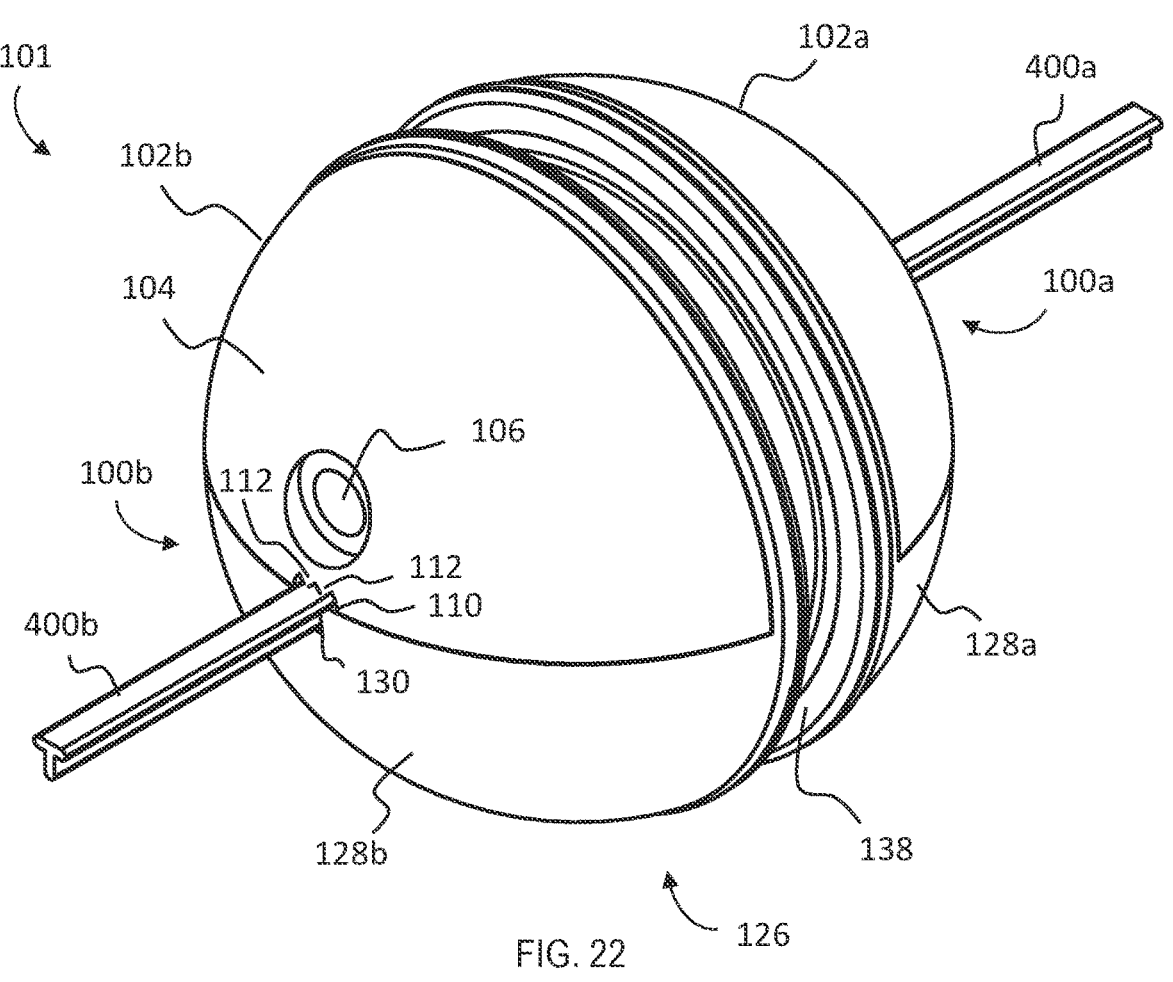
FIG. 22 is a schematic diagram providing an isometric view of a rotatable clamp assembly comprising a first rotatable clamp clamping a first razor component and a second rotatable clamp clamping a second razor component.
Figures 31, 32:
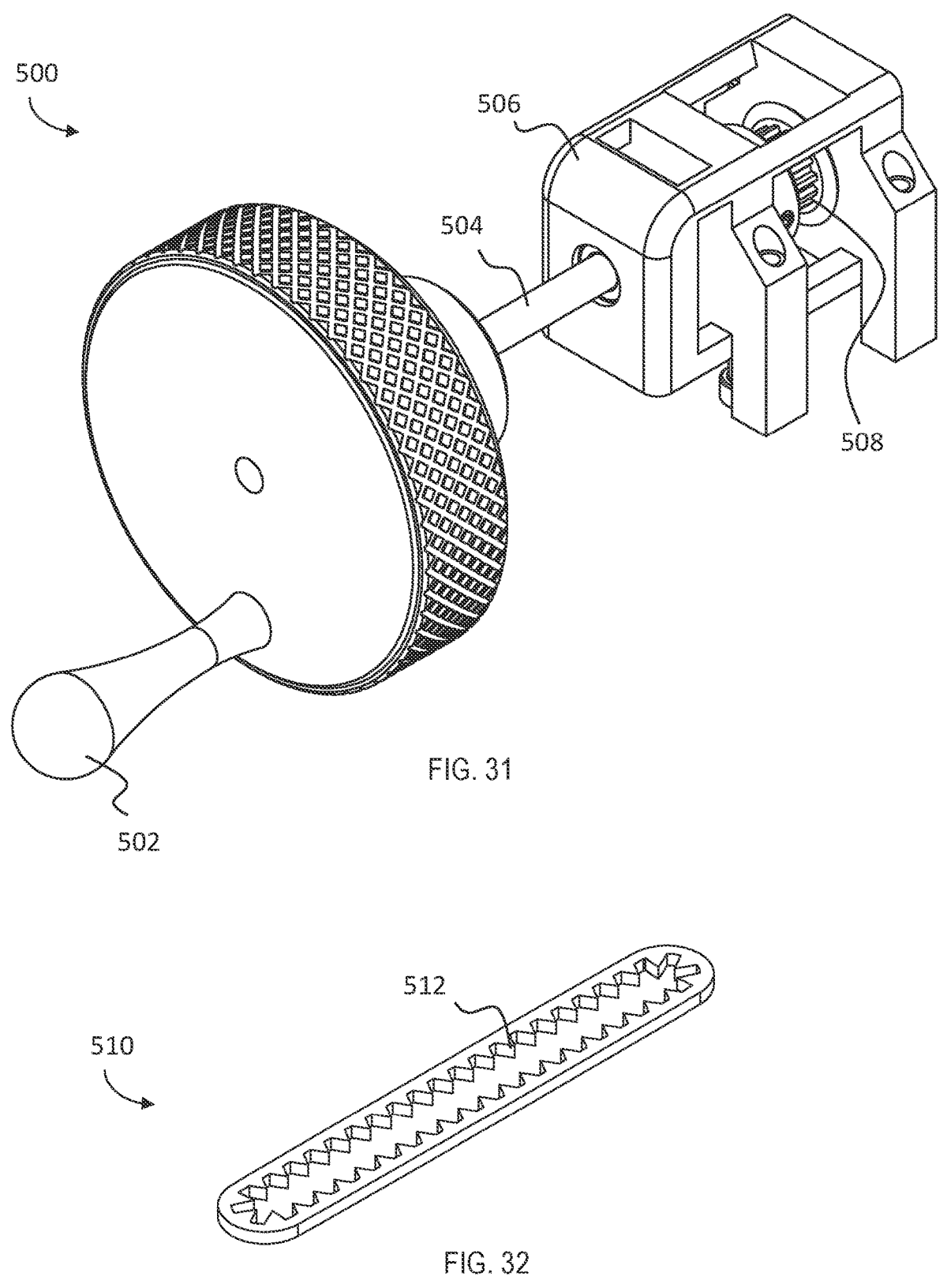

FIG. 14, FIG. 15, and FIG. 16 cooperate to illustrate a body 300 of a razor component testing apparatus 2. FIG. 14 is a schematic diagram providing an isometric view of a body 300 of a razor component testing apparatus 2. FIG. 15 is a schematic diagram providing a top view of a body 300 of a razor component testing apparatus 2. FIG. 16 is a schematic diagram providing a cross-sectional view of the body 300 of the razor component testing apparatus 2 shown in FIG. 15, along line A-A. The body 300 may define a drive belt aperture 304 through which a drive belt 510 (See: FIG. 32) may pass. The body 300 may also define an actuator shaft aperture 306 through which a drive shaft 504 may pass. The body 300 may further define an actuator clearance groove 308 to provide clearance for a crank handle 502 of an actuator 500 (See: FIG. 31). Next, the body 300 may comprise a rotatable clamp support 302 to accommodate a rotatable clamp assembly 101 (See: FIG. 22). Finally, it is to be appreciated that the previously mentioned bottom portion 214a of a first fixed clamp 200a and a bottom portion 214b of a second fixed clamp 200b may be integrally formed with the body 300 or otherwise affixed thereto.

FIG. 17, FIG. 18, FIG. 19, FIG. 20, and FIG. 21 cooperate to illustrate one type of fixed clamp 200, 200a, 200b that may be used in any of the razor component testing apparatuses 1, 2 described herein. It is to be appreciated that any variation of a fixed clamp 200, 200*a*, 200*b* described herein may be employed in the razor component testing apparatuses 1, 2. Variations on the fixed clamps 200, 200*a*, 200*b* may also be employed.

Figure 17:
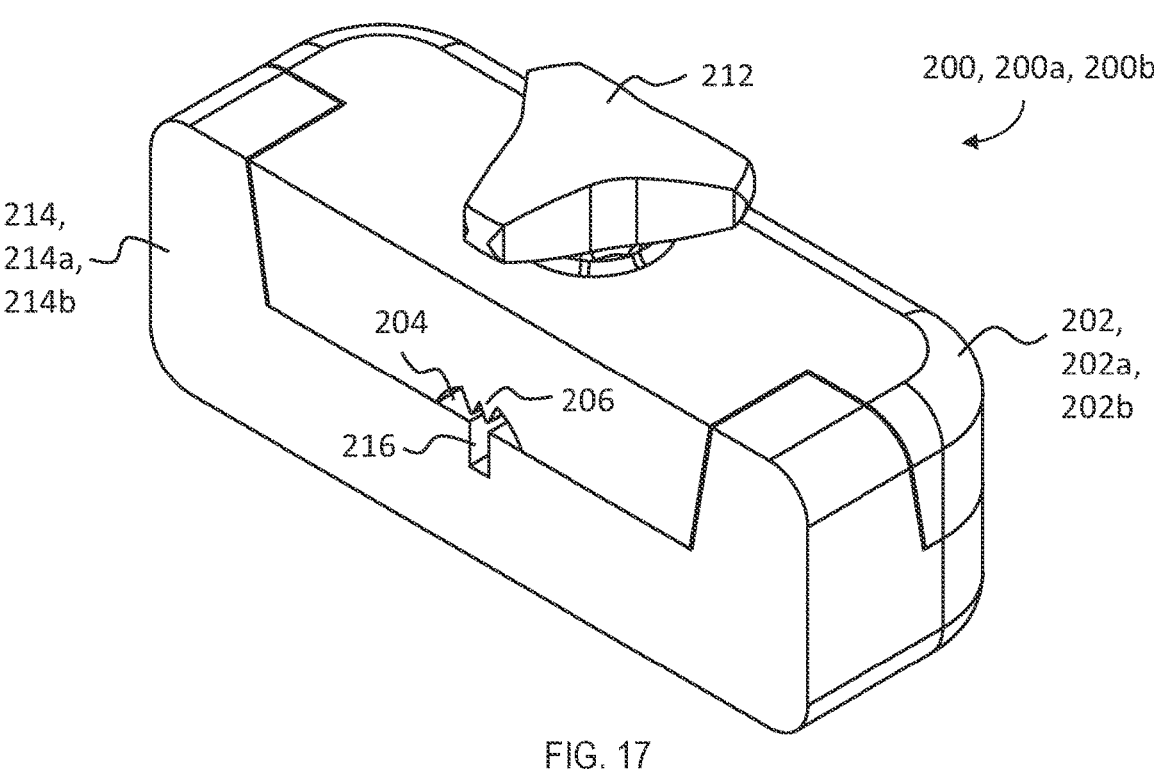
FIG. 17 is a schematic diagram providing an isometric view of fixed clamp of a razor component testing apparatus.
Figure 18:
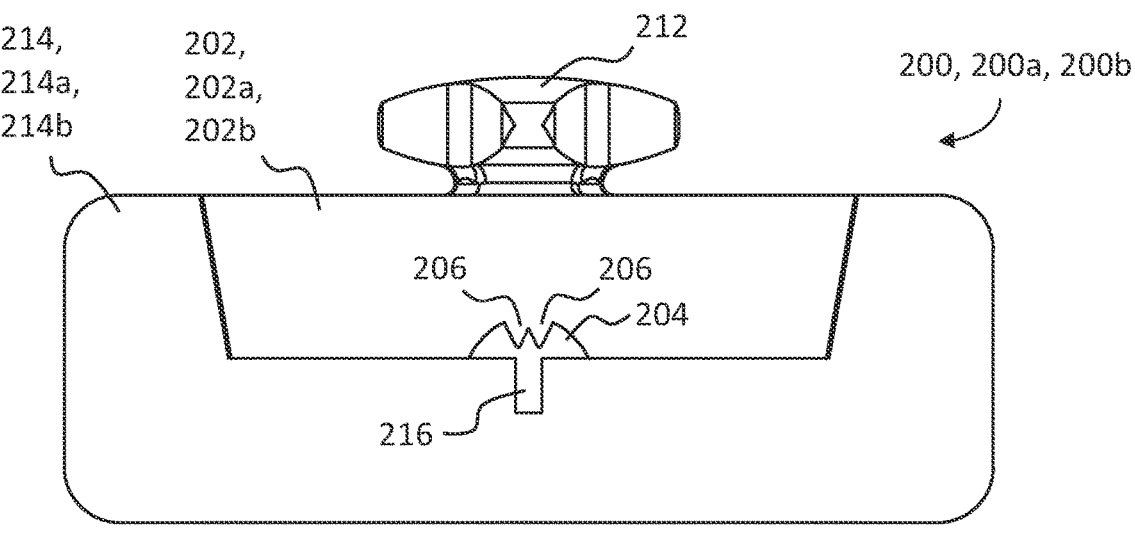
FIG. 18 is a schematic diagram providing a front view of a fixed clamp of a razor component testing apparatus.

FIG. 17 is a schematic diagram providing an isometric view and FIG. 18 is a schematic diagram providing a front view of fixed clamp 200, 200*a*, 200*b* of a razor component testing apparatus 1, 2. A fixed clamp 200, 200*a*, 200*b* may comprise a top portion 202, 202*a*, 202*b*, and a bottom portion 214, 214*a*, 214*b*. The top portion 202, 202*a*. 202*b* may comprise a top clamp groove 204. One or more gripping teeth 206 may be defined within the top clamp groove 204. The top portion 202, 202*a*, 202*b* may also include a grip 212 to allow a user to handle the top portion 202, 202*a*, 202*b* more easily. The grip 212 may, for example, facilitate the attachment or detachment of the top portion 202, 202*a*, 202*b* to or from the bottom portion 214, 214*a*. 214*b*. The bottom portion 214, 214*a*, 214*b* may comprise a bottom clamp groove 216. The top clamp groove 204 and the bottom clamp groove 216 may be a pair of cooperating grooves shaped to receive a first end 401, 401*a*, 401*b* or a second end 402, 402*a*, 402*b* of a shaving razor component 400, 400*a*, 400*b* (See: FIG. 4 or FIG. 12). The one or more gripping teeth 206 may be positioned within the pair of cooperating grooves 204, 216 to press against or to penetrate a horizontally extending top portion 404 of a razor component 400 that has an extended T-shape (See: FIG. 4, and FIG. 12).

Figure 19:
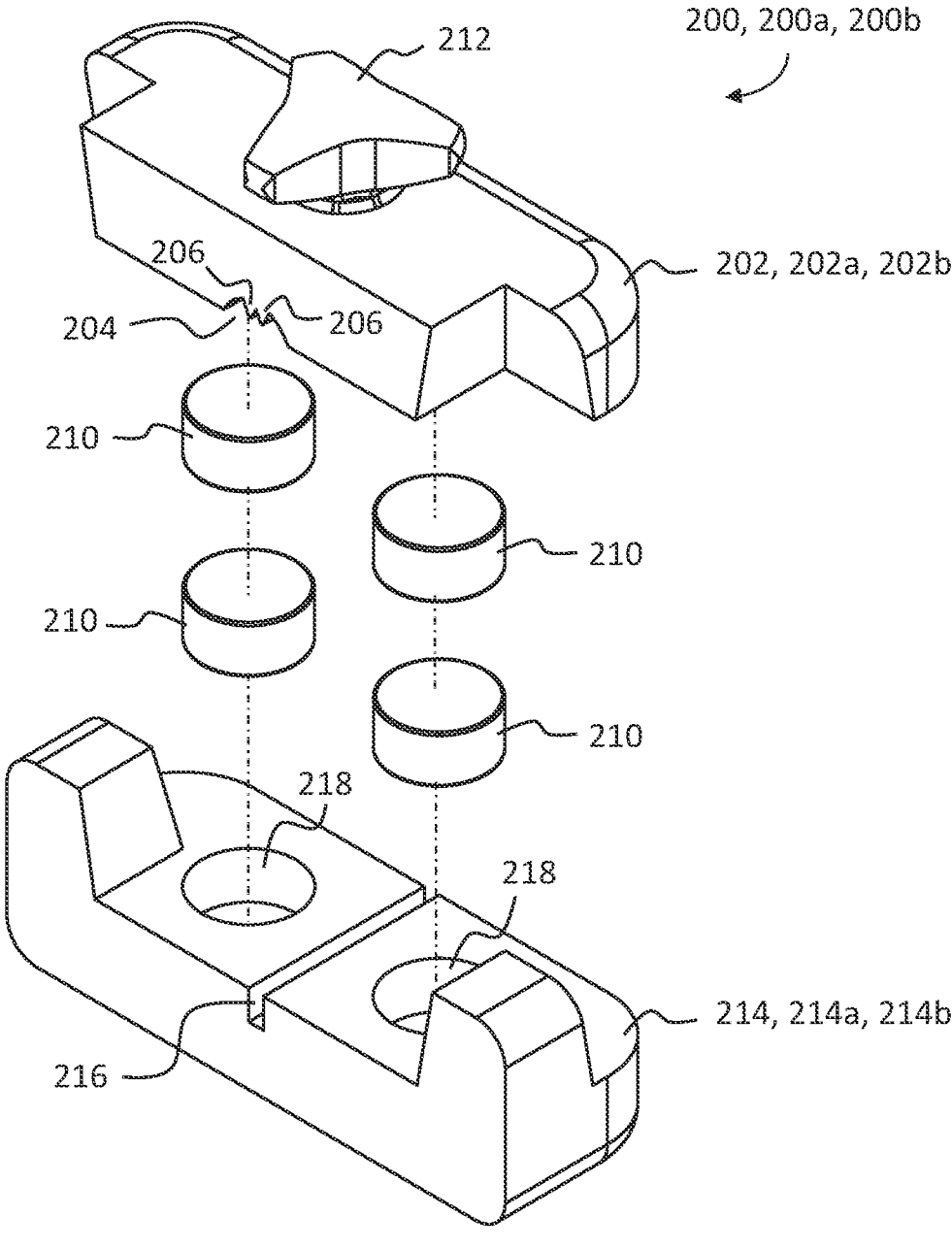
FIG. 19 is a schematic diagram providing an exploded view of a fixed clamp of a razor component testing apparatus.
Figure 20:
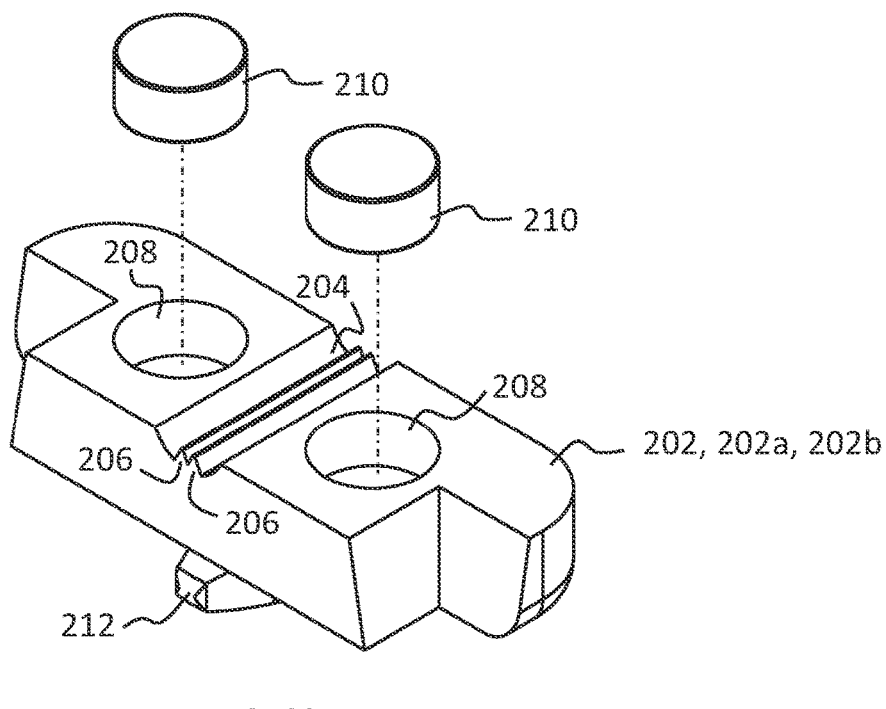
FIG. 20 is a schematic diagram providing an exploded bottom view of a top portion of a fixed clamp of a razor component testing apparatus.

FIG. 19 is a schematic diagram providing an exploded view of fixed clamp 200, 200*a*, 200*b* of a razor component testing apparatus 1, 2. The bottom portion 214, 214*a*, 214*b* may comprise one or more apertures 218, which may accommodate a magnet 210, a bolt, or a nut. FIG. 20 is a schematic exploded bottom view of a top portion 202, 202*a*, 202*b* of a fixed clamp 200, 200*a*, 200*b* of a razor component testing apparatus 1, 2. The top portion 202, 202*a*, 202*b* may comprise one or more apertures 208, which may accommodate a magnet 210, a bolt, or a nut. Cooperation of the magnets 210 or other suitable devices may generate a clamping force between the top portion 202, 202*a*, 202*b* and the corresponding bottom portion 214, 214*a*, 214*b*. The clamping force may be in a range of about 1 N to about 30 N.

Figure 21:
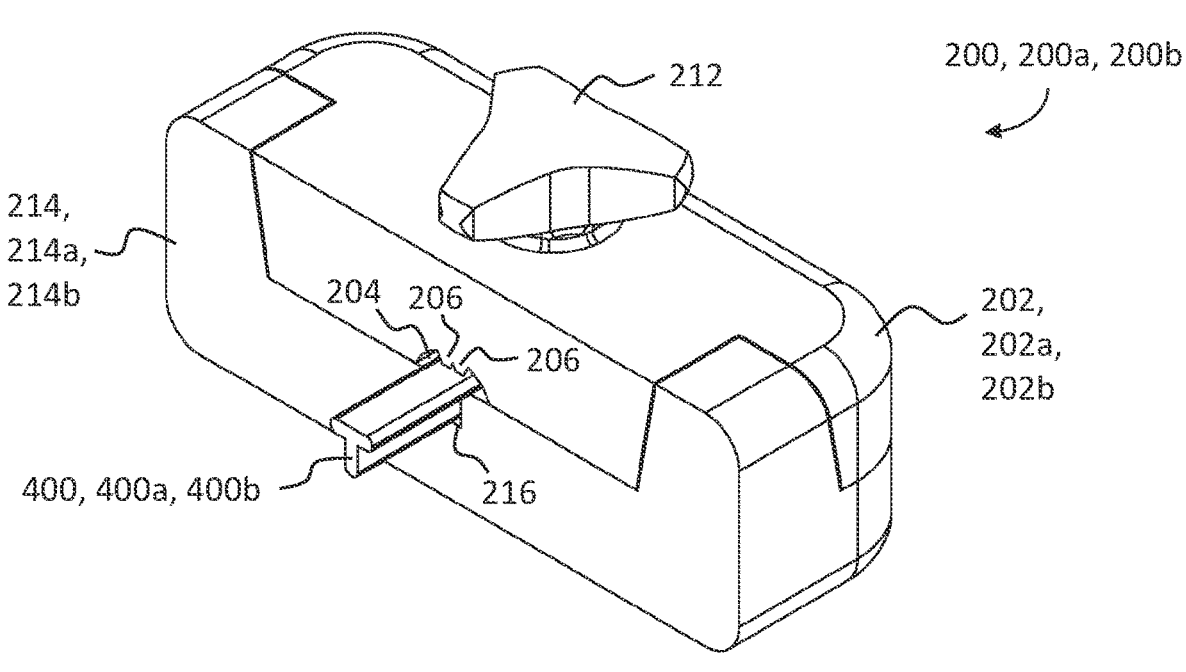
FIG. 21 is a schematic diagram providing an isometric view of a fixed clamp of a razor component testing apparatus clamping a razor component.

FIG. 21 is a schematic diagram providing an isometric view of a fixed clamp 200, 200*a*, 200*b* of a razor component testing apparatus clamping a razor component 1, 2. As shown, the one or more gripping teeth 206 may press against the horizontally extending top portion 404 of the extended T-shaped razor component 400. The number and positioning of the gripping teeth 206 may be calibrated along with the clamping force for specific razor component(s) 400, 400*a*. 400*b* to avoid crushing the razor component 400, 400*a*, 400*b* and to allow the razor component(s) 400, 400*a*, 400*b* to fail between the rotatable clamp 100, 100*a*, 100*b* and the corresponding fixed clamp 200, 200*a*, 200*b* instead of at the point where the razor component(s) 400 is/are gripped by the rotatable clamp(s) 100, 100*a*, 100*b* or by the fixed clamp(s) 200, 200*a*, 200*b*.

FIG. 22, FIG. 23, FIG. 24, FIG. 25, FIG. 26, FIG. 27, FIG. 28, FIG. 29, FIG. 30, and FIG. 31 cooperate to illustrate a rotatable clamp assembly 101 and various components thereof. The rotatable clamp assembly may comprise a first rotatable clamp 100*a* and a second rotatable clamp 100*b*. These rotatable clamps 100*a*. 100*b* exemplify one type of rotatable clamp 100, 100*a*, 100*b* that may be used in any of the razor component testing apparatuses 1, 2 described herein. It is to be appreciated that any variation of a rotatable clamp 100, 100*a*, 100*b* described herein may be employed in the razor component testing apparatuses 1, 2. Variations on the rotatable clamps 100, 100*a*, 100*b* may also be employed.

Figure 23:
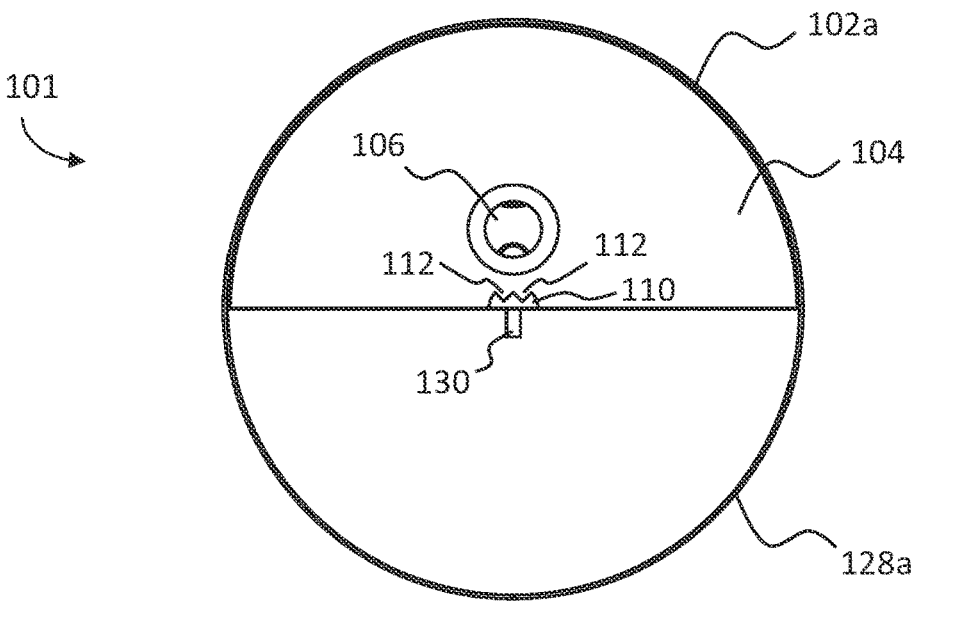
FIG. 23 is a schematic diagram providing a side view of a rotatable clamp assembly.

FIG. 22 is a schematic diagram providing an isometric view and FIG. 23 is a schematic diagram providing a side view of a rotatable clamp assembly 101 comprising a first rotatable clamp 100*a* clamping a first razor component 400*a* and a second rotatable clamp 100*b* clamping a second razor component 400*b*. The first rotatable clamp 100*a* may comprise a top portion 102*a* and a bottom portion 128*a*. Similarly, the second rotatable clamp 100*b* may comprise a top portion 102*b* and a bottom portion 128*b*. It is to be appreciated that the top portions 102*a*. 102*b* and the bottom portions 128*a*, 128*b* of the first rotatable clamp 100*a* and the second rotatable clamp 100*b* may have the same or similar features.

The top portions 102*a*, 102*b* may comprise an outer surface 104. The outer surface 104 may comprise a gripping tool aperture 106 to allow a tool (not shown) to be inserted into the top portion 102*b* to make it easier for a user to detach the top portion 102*a*, 102*b* from the base assembly 126. The bottom portions 128*a*, 128*b* maybe affixed to or integral with a base assembly 126, such that the base assembly 126 may comprise both bottom portions 128*a*, 128*b*. The base assembly 126 may define a rotation groove 138, which may be rotatably coupled to a rotatable clamp support 302 of their body 300 of a razor component testing apparatus 2 (See: FIGS. 14-16).

The top portions 102*a*, 102*b* may comprise a top clamp groove 110. One or more gripping teeth 112 may be defined within the top clamp groove 110. The bottom portions 128*a*. 128*b* may comprise a bottom clamp groove 130. The top clamp groove 110 and the bottom clamp groove 130 may be a pair of cooperating grooves shaped to receive a first end 401, 401*a*, 401*b* or a second end 402, 402*a*, 402*b* of a shaving razor component 400, 400*a*, 400*b* (See: FIG. 4 or FIG. 12). The one or more gripping teeth 112 may be positioned within the pair of cooperating grooves 110, 130 to press against or to penetrate a horizontally extending top portion 404 of a razor component 400 that has an extended T-shape (See: FIG. 4, and FIG. 12). The number and positioning of the gripping teeth 112 may be calibrated along with the clamping force for specific razor component(s) 400, 400*a*, 400*b* to avoid crushing the razor component 400, 400*a*, 400*b* and to allow the razor component(s) 400, 400*a*, 400*b* to fail between the rotatable clamp 100, 100*a*, 100*b* and the fixed clamp 200, 200*a*, 200*b* instead of at the point where the razor component(s) 400 is/are gripped by the rotatable clamp(s) 100, 100*a*, 100*b* or by the fixed clamp(s) 200.

Figure 24:
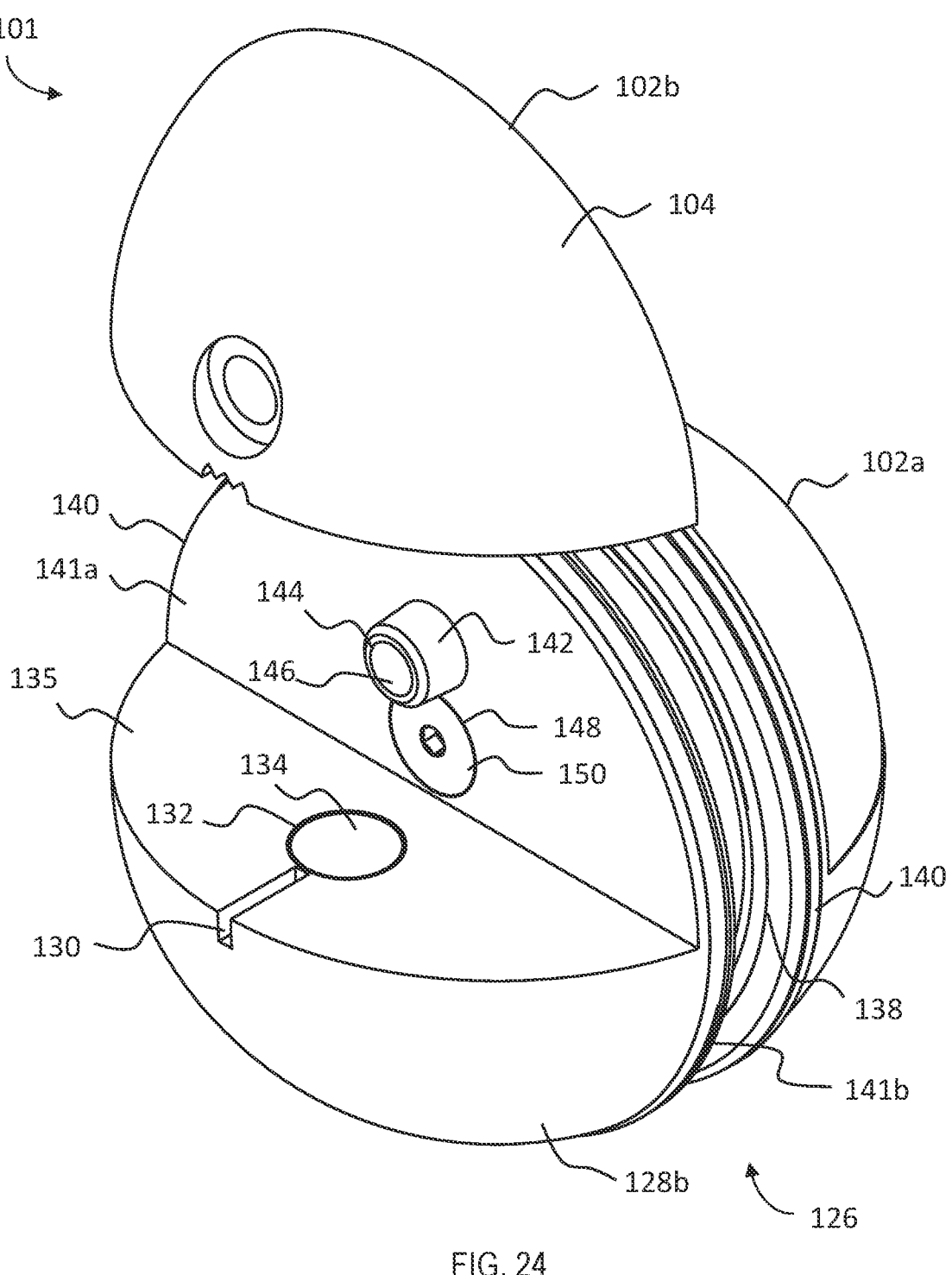
FIG. 24 is a schematic diagram providing a partially exploded isometric view of a rotatable clamp assembly.
Figure 25:
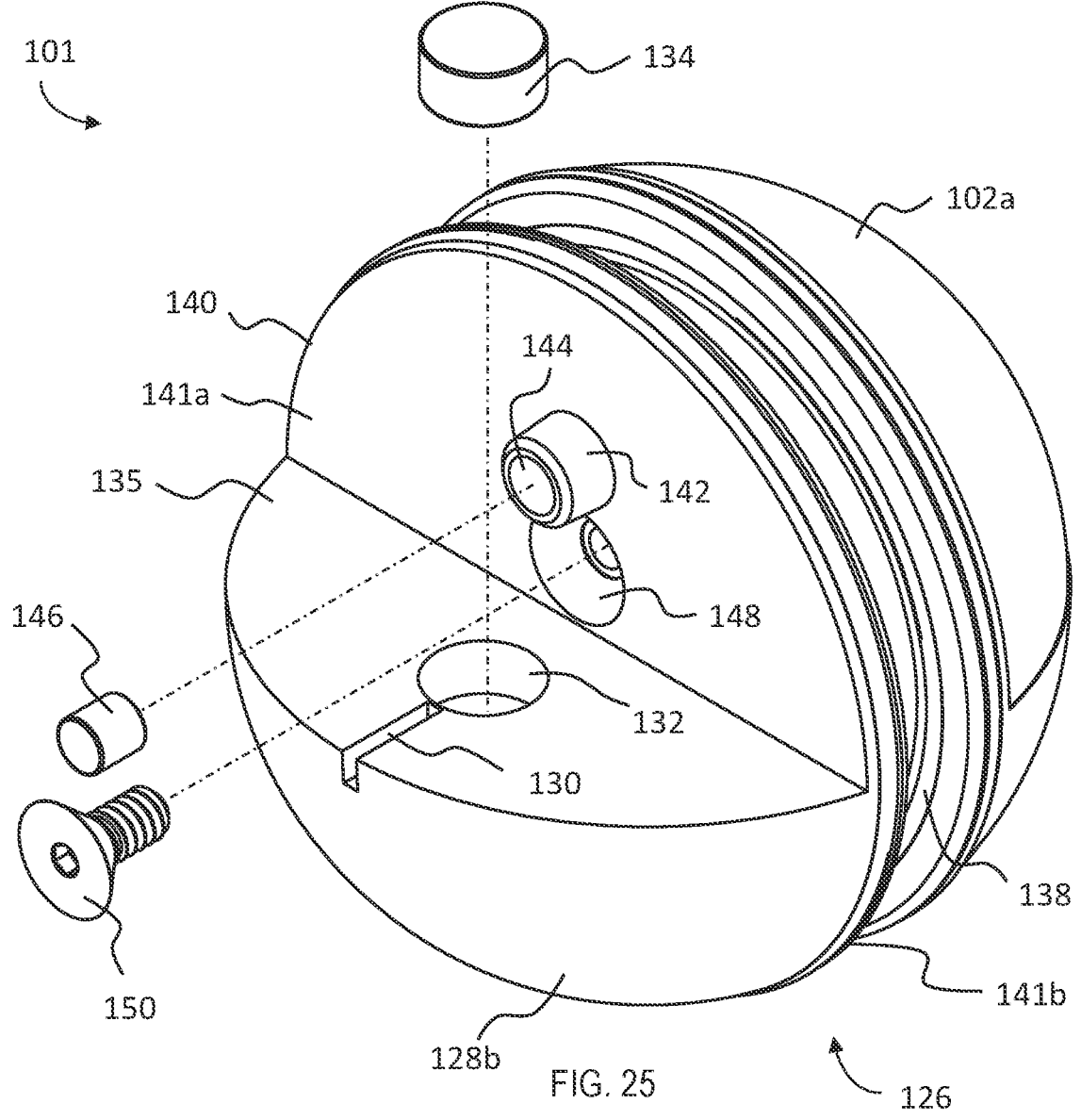
FIG. 25 is a schematic diagram providing a partially exploded isometric view of a rotatable clamp assembly with one top portion, embodied as a quarter-spherical removable portion, removed.

FIG. 24 is a schematic diagram providing a partially exploded isometric view of a rotatable clamp assembly 101. FIG. 25 is a schematic diagram providing a partially exploded isometric view of a rotatable clamp assembly 101 with one top portion 102*b*, embodied as a quarter-spherical removable portion, removed. Although only one half of the base assembly 126 is exposed and illustrated, it is to be appreciated that the base assembly 126 may comprise two halves having the same or similar features. The base assembly 126 may comprise a pair of opposing internal sidewalls 140, which may be spaced apart from each other and separated by the rotation groove 138. Each internal sidewall 140 may comprise a first side 141*a* and a second side 141*b*. A threaded aperture 148 may extend through each internal sidewall 140 to accommodate a screw 150 that may hold the two halves of the base assembly 126 together. A magnet nub 142 may extend from the first side 141*a* of the internal sidewall. The magnet nub 142 may comprise a magnet aperture 144, which may be sized and shaped to accommodate a magnet 146. The bottom portions 128*a*, 128*b* of each half of the base assembly 126 may comprise a base wall 135 that extends perpendicularly from the internal side wall 140. The bottom clamp groove 130 may be defined in the base wall 135. The base wall 140 may also comprise an aperture 132 to accommodate a magnet 134.

Figure 26:
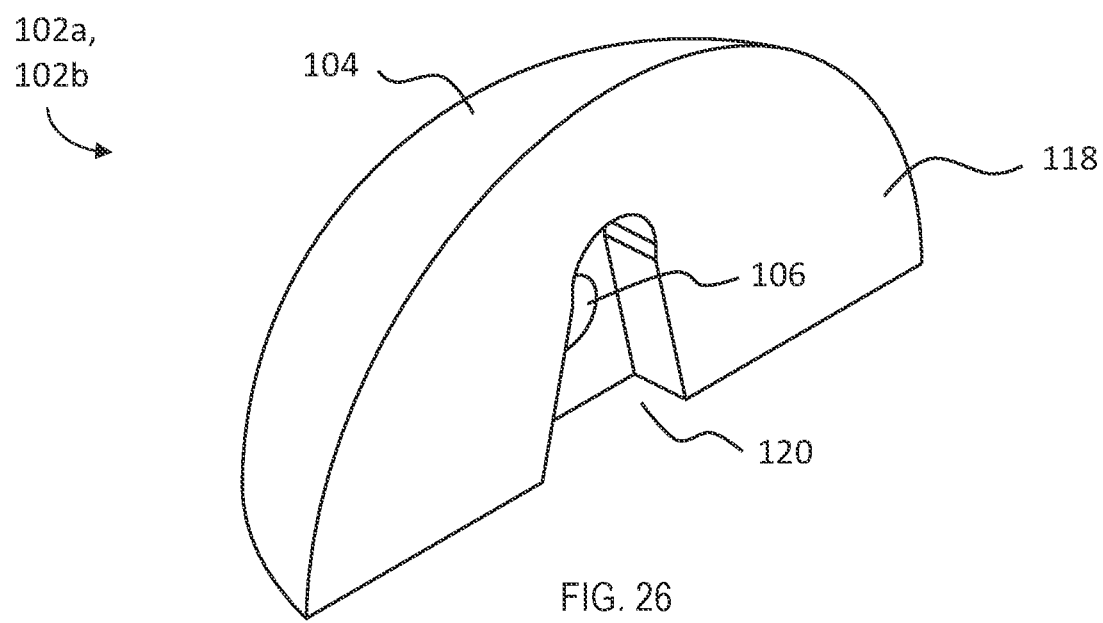
FIG. 26 is a schematic diagram providing an isometric view of a top portion, embodied as a quarter-spherical removable portion, of a rotatable clamp assembly.
Figure 27:
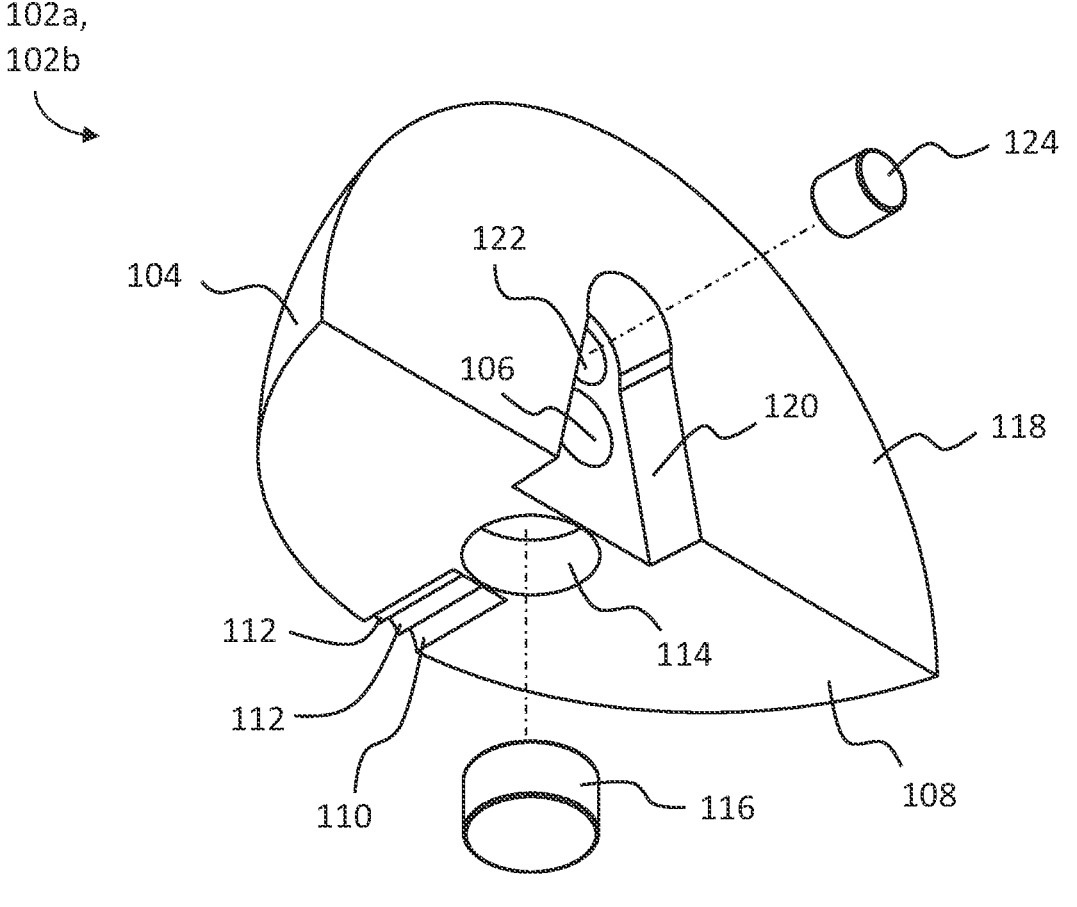
FIG. 27 is a schematic diagram providing an exploded isometric view of a top portion, embodied as a quarter-spherical removable portion, of a rotatable clamp assembly.

FIG. 26 is a schematic diagram providing an isometric view and FIG. 27 is a schematic diagram providing an exploded isometric view of a top portion 102*a*, 102*b*, embodied as a quarter-spherical removable portion, of a rotatable clamp assembly 101. The top portion 102*a*. 102*b* may comprise an outer surface 104, a bottom wall 108, and an inner sidewall 118. A side nub groove 120 may be defined in the bottom wall 108 and the inner sidewall 118. A gripping tool aperture 106 may extend through the outer surface 104 and into the side nub groove 120 to allow a tool (not shown) to be inserted therethrough and to press against an internal sidewall 140 of the base assembly 126 (See: FIGS. 24, 25) to detach a top portion 102*a*, 102*b* from the base assembly 126. The side nub groove 120 or the inner sidewall 118 may further comprise an aperture 122 to accommodate a magnet 124, which may cooperate with the magnet 144 (See: FIGS. 24, 25) disposed in one of the internal side walls 140 of the base assembly 126 to secure the top portion 102*a*, 102*b* to the base assembly 126. Similarly, the bottom wall 108 may comprise an aperture 114 to accommodate a magnet 116, which may cooperate with the magnet 134 (See: FIGS. 24, 25) disposed in one of the base walls 135 of the base assembly 126 to secure the top portion 102*a*, 102*b* to the base assembly 126. The bottom wall 108 may also comprise the top clamp groove 110 and the one or more gripping teeth 112, previously described.

Figure 28:
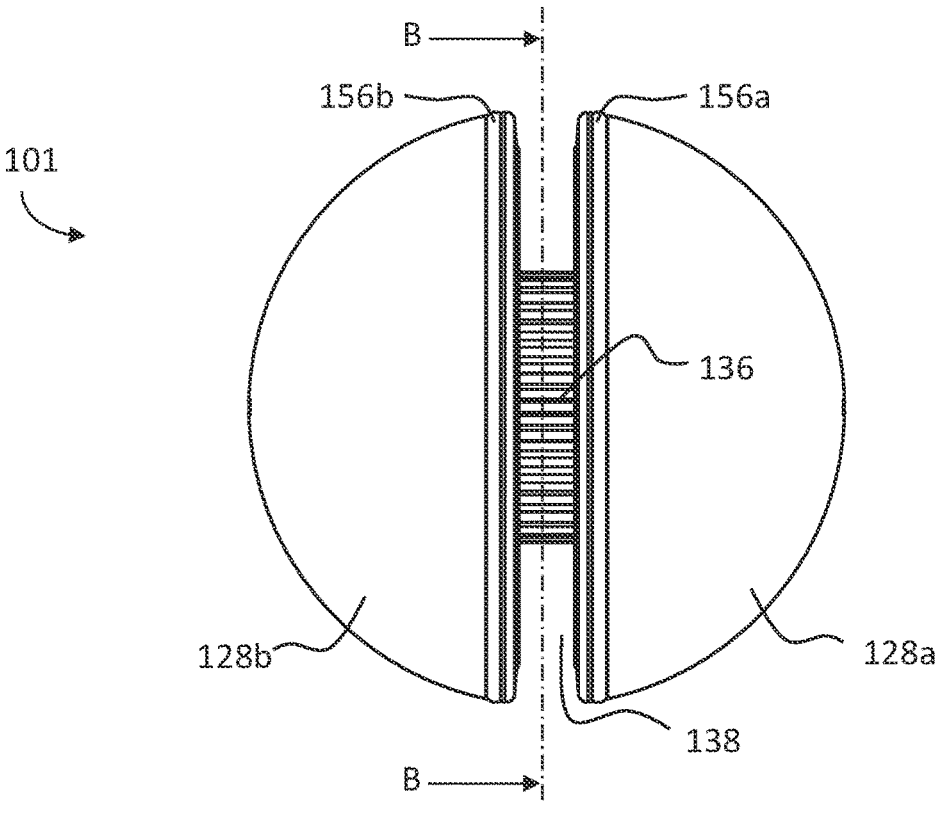
FIG. 28 is a schematic diagram providing a bottom view of a rotatable clamp assembly.
Figure 29:
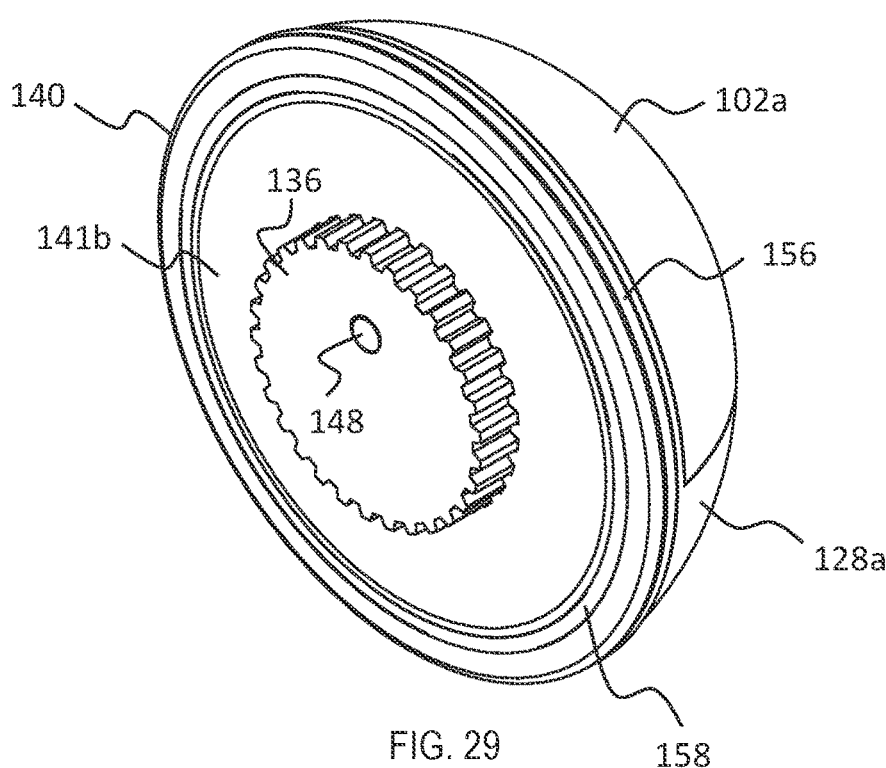
FIG. 29 is a schematic diagram providing an isometric view along line B-B as shown in FIG. 28 of a rotatable clamp assembly.
Figure 30:
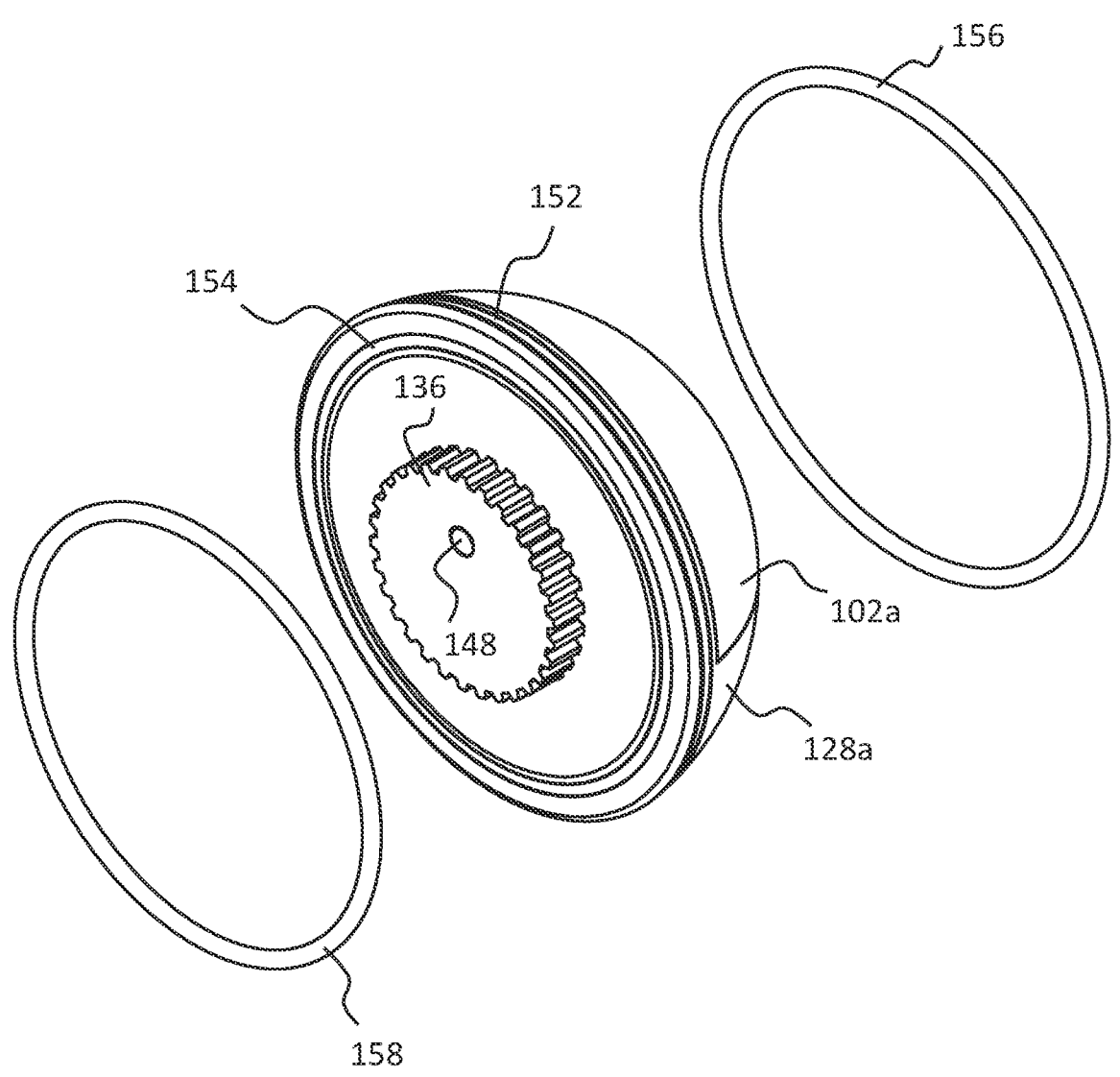
FIG. 30 is a schematic diagram providing an exploded isometric view along line B-B as shown in FIG. 28 of a rotatable clamp assembly.

FIG. 28 is a schematic diagram providing a bottom view of a rotatable clamp assembly 101. FIG. 29 is a schematic diagram providing an isometric view and FIG. 30 is a schematic diagram providing an exploded isometric view along line B-B as shown in FIG. 28 of a rotatable clamp assembly 101. The rotatable clamp assembly 101 may comprise a gear 136 disposed between the two halves thereof. For example, the gear 136 may be disposed between the internal sidewalls 140 of the two halves of the rotatable clamp assembly 101, such that it is affixed to or integrally formed with the second side 141*b* of the respective internal side wall 140. The threaded aperture 148 may optionally extend through the gear 136. The base assembly 126 may further comprise a pair of outer ring grooves 152 and a pair of inner ring grooves 154. The outer ring grooves 152 may accommodate outer rings 156 and the inner ring grooves 154 may accommodate inner rings 158. The outer rings 156 and the inner rings 154 may comprise a wear resistant material and may protect the base assembly 126 from excessive wear as it rotatably engages the rotatable clamp support 302 of the body 300 (See: FIGS. 14-16).

Figure 33:
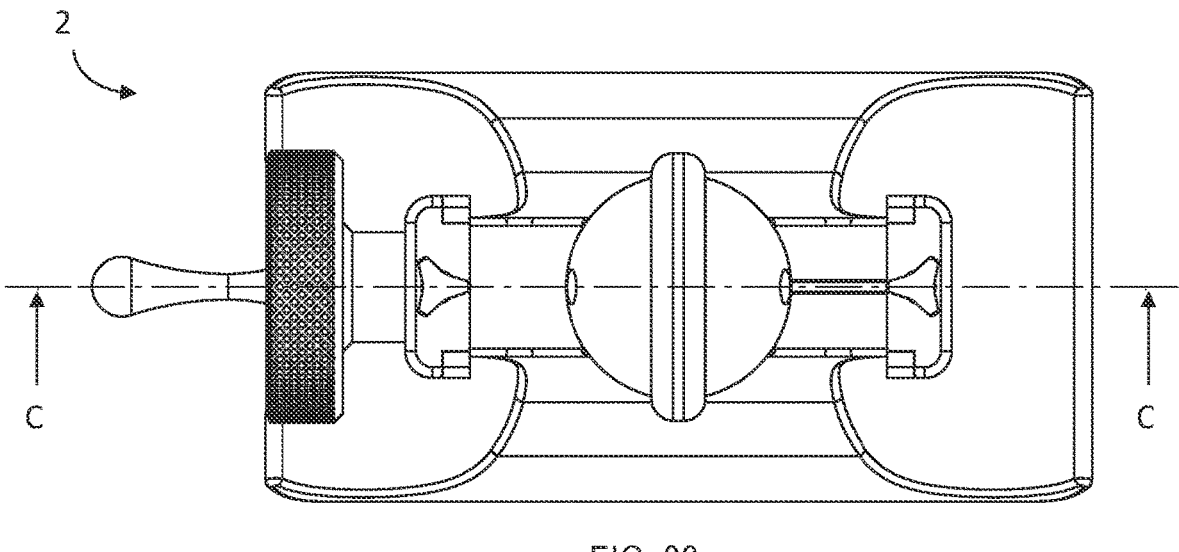
FIG. 33 is a schematic diagram providing a top view of a razor component testing apparatus.
Figure 34:
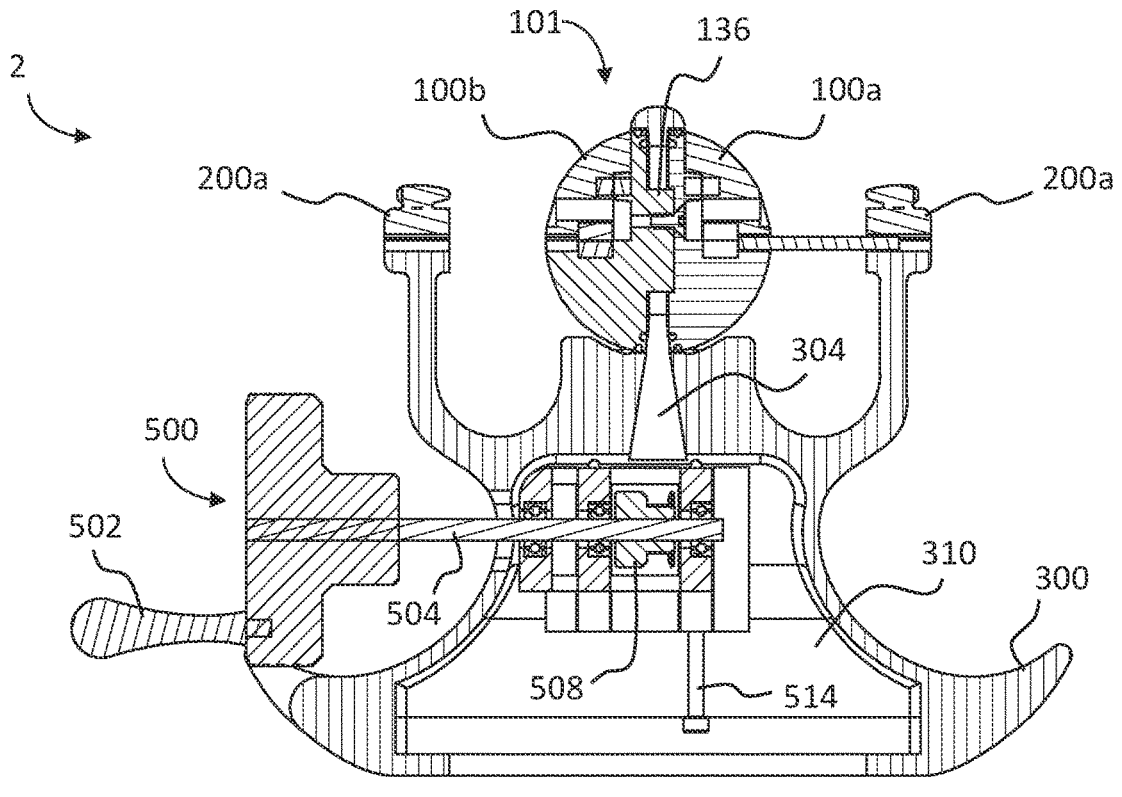
FIG. 34 is a schematic diagram providing a cross-sectional view of the razor component testing apparatus shown in FIG. 33, along line C-C.

FIG. 31. FIG. 32, FIG. 33, and FIG. 34 cooperate to illustrate an actuator 500 of a razor component testing apparatus 2 and a function thereof. FIG. 31 is a schematic diagram providing an isometric view of an actuator 500 of a razor component testing apparatus 2. The actuator 500 may comprise a crank handle 502 rotatably coupled to a drive shaft 504. It is to be appreciated that the drive shaft 504 may also be mechanically actuated. The drive shaft 504 may be supported by a frame 506 in which a gear 508 is disposed.

FIG. 32 is a schematic diagram providing an isometric view of a drive belt 510 of an actuator of a razor component testing apparatus 2. The drive belt 510 may comprise a plurality of teeth 512. The drive belt 510 may engage the gear 508. FIG. 33 is a schematic diagram providing a top view of a razor component testing apparatus. FIG. 34 is a schematic diagram providing a cross-sectional view of the razor component testing apparatus shown in FIG. 33, along line C-C. The frame 506 may be disposed within an internal cavity 310 of the body 300 of the razor component testing apparatus 2. The drive belt 501 may extend through a drive-belt aperture 304 in the body 300 to engage the gear 136 of the rotatable clamp assembly 101. The actuator 500 may thereby transfer rotational power from the crank handle 502 (or a suitable mechanical alternative) to the drive shaft 504 to the gear 508. The drive belt 510 may transfer rotational power from the gear 508 of the actuator 500 to the gear 136 of the rotatable clamp assembly 101 to rotate the rotatable clamp assembly 101 and thereby the first rotatable clamp 100*a* simultaneously with the second rotatable clamp 100*b*.

Figure 35:
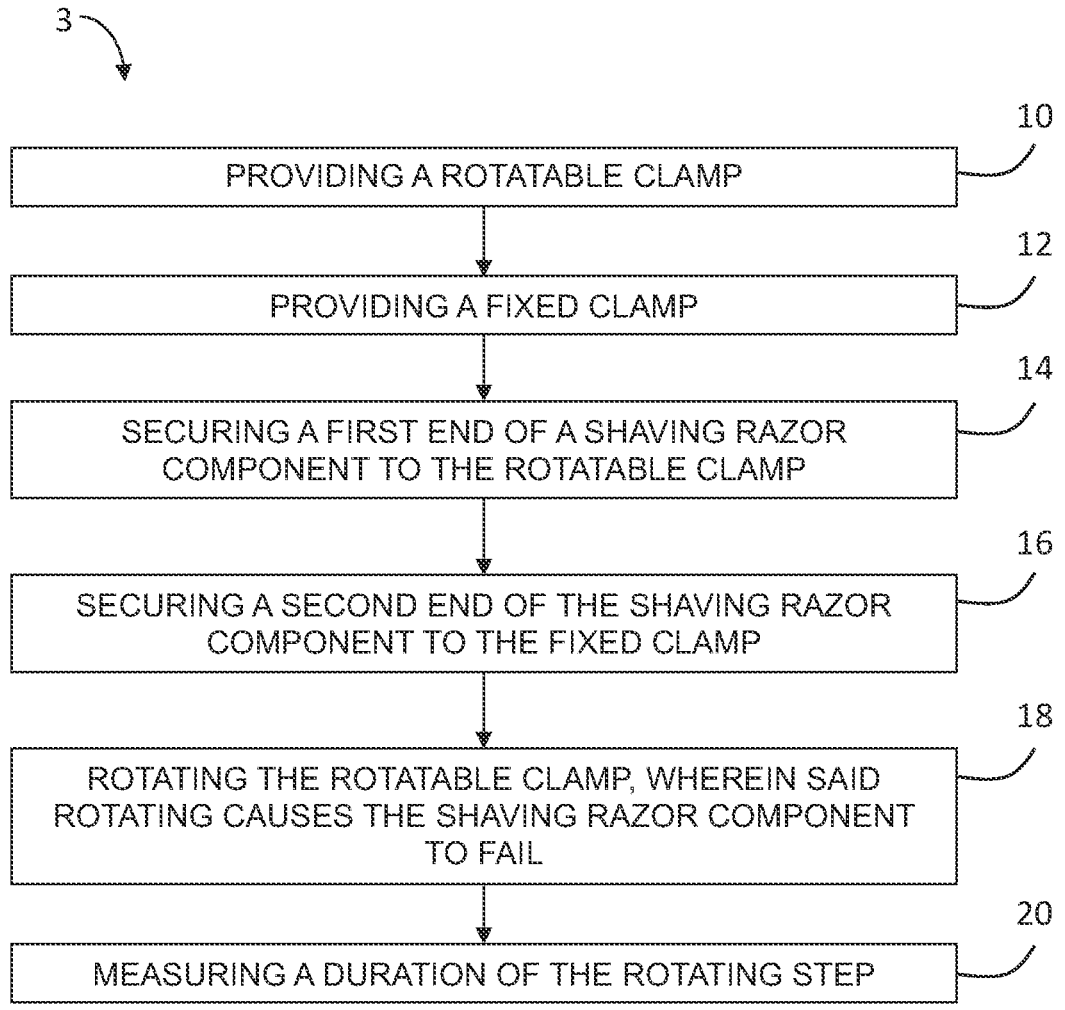
FIG. 35 is a schematic block diagram of a shaving razor component test method.

FIG. 35 is a schematic block diagram of a shaving razor component test method 3. The method 3 may comprise a step 10 of providing a rotatable clamp and a step 12 of providing a fixed clamp. The method 3 may further comprise a step 14 of securing a first end of a shaving razor component to the rotatable clamp and a step 16 of securing a second end of the shaving razor component to the fixed clamp. Next, the method 3 may comprise a step 18 of rotating the rotatable clamp, wherein said rotating causes the shaving razor component to fail. Finally, the method 3 may further comprise a step 20 of measuring a duration of the rotating step 18.

Figure 36:
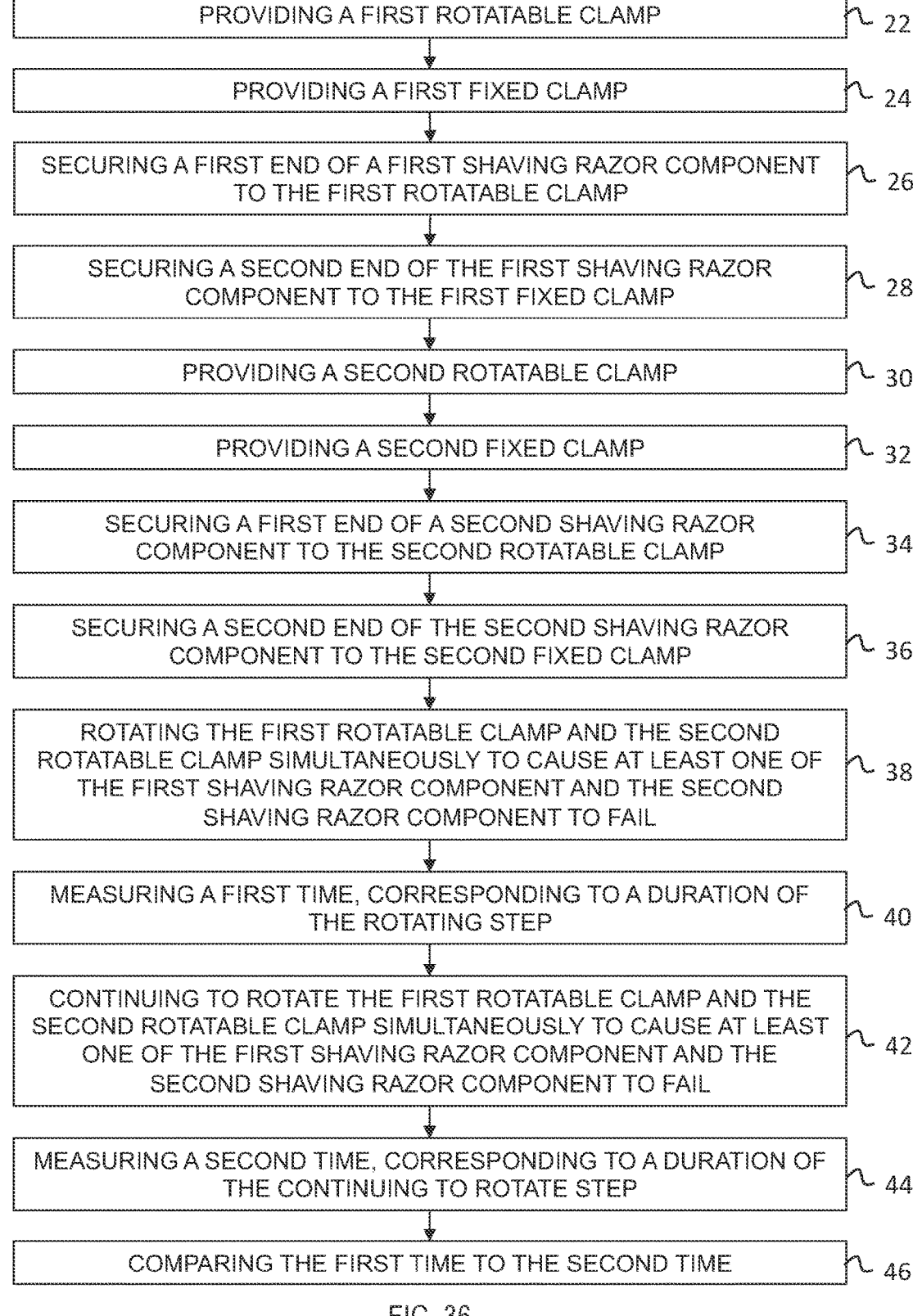
FIG. 36 is a schematic block diagram of a shaving razor component test method.

FIG. 36 is a schematic block diagram of a shaving razor component test method 4. The method 3 may comprise a step 22 of providing a first rotatable clamp and a step 24 of providing a first fixed clamp. The method 3 may further comprise a step 26 of securing a first end of a first shaving razor component to the first rotatable clamp and a step 28 of securing a second end of the first shaving razor component to the first fixed clamp. The method 3 may further comprise a step 30 of providing a second rotatable clamp and a step 32 of providing a second fixed clamp. The method 3 may further comprise a step 34 of securing a first end of a second shaving razor component to the second rotatable clamp and a step 36 of securing a second end of the second shaving razor component to the second fixed clamp. The method 3 may further comprise a step 38 of rotating the first rotatable clamp and the second rotatable clamp simultaneously, wherein said rotating causes at least one of the first shaving razor component and the second shaving razor component to fail. The method 3 may further comprise a step 40 of measuring a first time, corresponding to a duration of the rotating step 38. Thereafter, the method 3 may comprise a step 42 of continuing to rotate the first rotatable clamp and the second rotatable clamp simultaneously, wherein said continued rotating causes at least one of the first shaving razor component and the second shaving razor component to fail. Next, the method may comprise a step 44 of measuring a second time, corresponding to a duration of the continuing to rotate step 42. Finally, the method may comprise a step 46 of displaying, recording, or comparing the first time to the second time.

The components described herein may be fabricated from any suitable material, including but not limited to plastics, metals, and wood.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shaving razor component testing apparatus comprising:
   a body;
   a rotatable clamp mounted to the body;
   a fixed clamp mounted to the body and spaced apart from the rotatable clamp; and
   an actuator rotatably coupled to the rotatable clamp, wherein the fixed clamp comprises a pair of cooperating grooves shaped to receive a second end of a shaving razor component.

2. The shaving razor component of claim 1, wherein the rotatable clamp comprises a first plurality of magnets.

3. The shaving razor component testing apparatus of claim 2, wherein the first plurality of magnets imparts a clamping force of about 1 N to about 30 N.

4. The shaving razor component testing apparatus of claim 1, wherein the fixed clamp comprises a second plurality of magnets.

5. The shaving razor component testing apparatus of claim 4, wherein the second plurality of magnets imparts a clamping force of about 1 N to about 30 N.

6. The shaving razor component testing apparatus of claim 4, wherein the rotatable clamp comprises a pair of cooperating grooves shaped.

7. The shaving razor component testing apparatus of claim 6, wherein the rotatable clamp further comprises a pair of gripping teeth disposed in at least one of the pair of cooperating grooves.

8. The shaving razor component testing apparatus of claim 1, wherein the fixed clamp further comprises a pair of gripping teeth disposed in at least one of the pair of cooperating grooves.

9. A shaving razor component testing apparatus comprising:
   a body;

a first rotatable clamp mounted to the body;
a first fixed clamp mounted to the body and spaced apart from the first rotatable clamp;
a second rotatable clamp mounted to the body;
a second fixed clamp mounted to the body and spaced apart from the second rotatable clamp; and
an actuator rotatably coupled to the first rotatable clamp and the second rotatable clamp, wherein the first rotatable clamp comprises a first pair of cooperating grooves shaped to receive a first end of a first shaving razor component, and wherein the first fixed clamp comprises a second pair of cooperating grooves shaped to receive a second end of a first shaving razor component.

10. The shaving razor component testing apparatus of claim 9, wherein the first rotatable clamp comprises a first plurality of magnets and the first fixed clamp comprises a second plurality of magnets.

11. The shaving razor component testing apparatus of claim 9, wherein the first plurality of magnets imparts a first clamping force of about 1 N to about 30 N, and wherein the second plurality of magnets imparts a second clamping force of about 1 N to about 30 N.

12. The shaving razor component testing apparatus of claim 9, wherein the second rotatable clamp comprises a third plurality of magnets and the second fixed claim comprises a fourth plurality of magnets.

13. The shaving razor component testing apparatus of claim 12, wherein the third plurality of magnets imparts a first clamping force of about 1 N to about 30 N, and wherein the fourth plurality of magnets imparts a second clamping force of about 1 N to about 30 N.

14. The shaving razor component testing apparatus of claim 9, wherein the first rotatable clamp further comprises a first pair of gripping teeth disposed in at least one of the first pair of cooperating grooves, and wherein the first fixed clamp further comprises a second pair of gripping teeth disposed in at least one of the second pair of cooperating grooves.

15. The shaving razor component testing apparatus a of claim 9, wherein the second rotatable clamp comprises a first pair of cooperating grooves shaped to receive a first end of a second shaving razor component, and wherein the second fixed clamp comprises a second pair of cooperating grooves shaped to receive a second end of a second shaving razor component.

16. The shaving razor component testing apparatus of claim 9, wherein the second rotatable clamp further comprises a first pair of gripping teeth disposed in at least one of the first pair of cooperating grooves, and wherein the second fixed clamp further comprises a second pair of gripping teeth disposed in at least one of the second pair of cooperating grooves.

17. The shaving razor component testing apparatus of claim 9, further comprising a rotatable clamp assembly, wherein the rotatable clamp assembly comprises the first rotatable clamp, the second rotatable clamp, and a gear disposed therebetween.

18. The shaving razor component testing apparatus of claim 17, further comprising a belt drivingly coupling the actuator and the gear.

* * * * *